(12) United States Patent  (10) Patent No.: US 12,030,586 B2
Ortin et al.  (45) Date of Patent: Jul. 9, 2024

(54) SEAL FOR BICYCLE CRANK WITH DIFFERENTIAL CHAINRING MOTION

(71) Applicant: The Hive Global, Inc., Taichung (TW)

(72) Inventors: William B. Ortin, Taichung (TW); Joel D. Peters, Taichung (TW)

(73) Assignee: The Hive Global, Inc., Taichung (TW)

( * ) Notice: Subject to any disclaimer, the term of this patent is extended or adjusted under 35 U.S.C. 154(b) by 51 days.

(21) Appl. No.: 17/373,623

(22) Filed: Jul. 12, 2021

(65) Prior Publication Data

US 2023/0012006 A1  Jan. 12, 2023

(51) Int. Cl.
*B62M 3/00* (2006.01)
*B62J 13/00* (2006.01)
*B62M 1/36* (2013.01)
*B62M 6/55* (2010.01)

(52) U.S. Cl.
CPC .............. *B62M 3/003* (2013.01); *B62J 13/00* (2013.01); *B62M 1/36* (2013.01); *B62M 6/55* (2013.01)

(58) Field of Classification Search
CPC ............ G05G 1/36; G05G 3/00; G05G 3/003; G05G 3/02; G05G 3/04; G05G 6/40; G05G 6/55; G05G 6/60; G05G 6/65; G05G 6/70; B62J 13/00; F16J 15/3268; F16J 15/3284; F16J 15/3464
See application file for complete search history.

(56) References Cited

U.S. PATENT DOCUMENTS

| | | |
|---|---|---|
| 512,729 A | 1/1894 | Lucas et al. |
| 527,384 A | 10/1894 | Davids |
| 527,520 A | 10/1894 | Copeland |
| 547,639 A | 10/1895 | Grubb |
| 575,712 A | 1/1897 | Hamilton |
| 576,548 A | 2/1897 | Cassidy |
| 579,479 A | 3/1897 | Gobbler |
| 590,685 A | 9/1897 | Matthews |
| 595,388 A | 12/1897 | Hanson |
| 598,325 A | 2/1898 | McIntyre |
| 614,900 A | 11/1898 | Seaver |
| 616,167 A | 12/1898 | Walker |
| 620,266 A | 2/1899 | Woodiska |

(Continued)

FOREIGN PATENT DOCUMENTS

| | | |
|---|---|---|
| AT | 397641 B | 5/1994 |
| CN | 2115968 A | 9/1992 |

(Continued)

OTHER PUBLICATIONS

Machine Translation of JP 2019142351.*

(Continued)

*Primary Examiner* — Vinh Luong

(74) *Attorney, Agent, or Firm* — Haverstock & Owens, A Law Corporation

(57) ABSTRACT

A seal for a bicycle drivetrain is configured to shield and protect part of the bicycle drivetrain from contamination by materials commonly found in the cycling environment, namely dirt, oil, water and other debris found on cycling surfaces. The seal is configured to shield the bicycle drivetrain from grit that may foul lockring interfaces, leading to seized threads, and cause difficulty removing the lock ring when it comes time to service the motor or replace the chainring.

19 Claims, 13 Drawing Sheets

(56) References Cited

U.S. PATENT DOCUMENTS

| | | |
|---|---|---|
| 658,400 A | 9/1900 | Roberts |
| 666,679 A | 1/1901 | Kraus |
| 811,799 A | 2/1906 | Seidemann |
| 848,870 A | 4/1907 | Weller |
| 1,070,971 A | 8/1913 | Lowd |
| 1,325,206 A | 12/1919 | Raybon |
| 1,400,131 A | 12/1921 | Adams |
| 1,535,601 A | 4/1925 | Graham |
| 1,636,327 A | 7/1927 | Roe |
| 2,015,430 A | 9/1935 | Matthew |
| 2,024,499 A | 12/1935 | Baron |
| 2,139,176 A | 12/1938 | Sims |
| 2,228,770 A | 1/1941 | Le Tourneau |
| 2,317,070 A | 4/1943 | Le Tourneau |
| 2,567,785 A | 9/1951 | Rieger |
| 2,568,443 A | 9/1951 | Gerner |
| 2,751,797 A | 6/1956 | Pearl |
| 3,184,993 A | 5/1965 | Swenson |
| 3,185,439 A | 5/1965 | Inaba et al. |
| 3,303,720 A | 2/1967 | Jaulmes |
| 3,332,297 A | 7/1967 | Morse |
| D208,683 S | 9/1967 | Schreckengost |
| 3,382,734 A | 5/1968 | Hussey |
| 3,416,385 A | 12/1968 | Schenk |
| 3,477,303 A | 11/1969 | Brilando |
| 3,485,113 A | 12/1969 | Adcock |
| 3,592,076 A | 7/1971 | Baginski |
| 3,748,916 A | 7/1973 | Morse |
| 3,760,653 A | 9/1973 | Hagenah |
| 3,785,129 A | 1/1974 | Anthamatten |
| 3,807,255 A | 4/1974 | Baginski |
| 3,811,339 A | 5/1974 | Konzorr |
| 3,869,138 A | 3/1975 | Allison |
| 3,910,136 A | 10/1975 | Juy |
| 3,933,373 A | 1/1976 | Gammelgaard |
| 3,964,343 A | 6/1976 | Lauterbach |
| 3,973,447 A | 8/1976 | Nagano |
| 4,016,357 A | 4/1977 | Abrahamsen |
| 4,037,484 A | 7/1977 | Morse |
| 4,044,621 A | 8/1977 | McGregor, Sr. |
| 4,078,444 A | 3/1978 | Huret |
| 4,089,236 A | 5/1978 | Genzling |
| 4,093,325 A | 6/1978 | Troccaz |
| 4,135,727 A | 1/1979 | Camagnolo |
| 4,237,743 A | 12/1980 | Nagano |
| 4,240,303 A | 12/1980 | Mosley |
| 4,269,084 A | 5/1981 | Okajima |
| 4,298,210 A | 11/1981 | Lotteau |
| 4,302,987 A | 12/1981 | Takeda |
| 4,324,323 A | 4/1982 | Campagnolo |
| 4,330,137 A | 5/1982 | Nagano |
| 4,337,933 A | 7/1982 | Egami |
| 4,377,952 A | 3/1983 | Gamondes |
| 4,380,445 A | 4/1983 | Shimano |
| 4,398,434 A | 8/1983 | Kimura |
| 4,429,448 A | 2/1984 | Butz |
| 4,433,963 A | 2/1984 | Shimano |
| 4,439,172 A | 3/1984 | Segawa |
| 4,441,383 A | 4/1984 | Segawa |
| 4,442,732 A | 4/1984 | Okajima |
| 4,445,289 A | 5/1984 | Beneteau |
| 4,445,397 A | 5/1984 | Shimano |
| 4,472,163 A | 9/1984 | Bottini |
| 4,475,894 A | 10/1984 | Sugino |
| 4,487,424 A | 12/1984 | Ellis |
| 4,488,453 A | 12/1984 | Drugeon |
| 4,498,890 A | 2/1985 | Sutherland |
| 4,506,463 A | 3/1985 | Chassing |
| 4,507,105 A | 3/1985 | Stottmann |
| 4,515,386 A | 5/1985 | Tsujimura |
| 4,523,492 A | 6/1985 | Shimano |
| 4,538,480 A | 9/1985 | Trindle |
| 4,548,422 A | 10/1985 | Michel et al. |
| 4,573,950 A | 3/1986 | Nagano |
| 4,608,878 A | 9/1986 | Shimano |
| 4,632,416 A | 12/1986 | Zelenetz |
| 4,639,240 A | 1/1987 | Liu |
| 4,640,151 A | 2/1987 | Howell |
| 4,646,586 A | 3/1987 | Raposarda |
| 4,662,862 A | 5/1987 | Matson |
| 4,665,767 A | 5/1987 | Lassche |
| 4,686,867 A | 8/1987 | Bernard |
| 4,704,919 A | 11/1987 | Durham |
| 4,735,107 A | 4/1988 | Winkie |
| D298,613 S | 11/1988 | McMurtey |
| 4,791,692 A | 12/1988 | Collins |
| 4,803,894 A | 2/1989 | Howell |
| 4,811,626 A | 3/1989 | Bezin |
| 4,815,333 A | 3/1989 | Sampson |
| 4,827,633 A | 5/1989 | Feldstein |
| 4,832,667 A | 5/1989 | Wren |
| 4,838,115 A | 6/1989 | Nagano |
| 4,840,085 A | 6/1989 | Nagano |
| 4,854,924 A | 8/1989 | Nagano |
| 4,856,801 A | 8/1989 | Hollingsworth |
| 4,873,890 A | 10/1989 | Nagano |
| 1,882,946 A | 11/1989 | Beyl |
| 4,893,523 A | 1/1990 | Lennon |
| 4,898,063 A | 2/1990 | Sampson |
| 4,900,050 A | 2/1990 | Bishop et al. |
| 4,905,541 A | 3/1990 | Alan |
| 4,923,324 A | 5/1990 | Favrou |
| 4,928,549 A | 5/1990 | Nagano |
| 4,932,287 A | 6/1990 | Ramos |
| 4,947,708 A | 8/1990 | Lacomb |
| 4,986,949 A | 1/1991 | Trimble |
| 5,002,520 A | 3/1991 | Greenlaw |
| 5,003,841 A | 4/1991 | Nagano |
| 5,014,571 A | 5/1991 | Dapezi |
| 5,018,564 A | 5/1991 | Anglin |
| 5,019,312 A | 5/1991 | Bishop |
| 5,046,382 A | 9/1991 | Steinberg |
| 5,048,369 A | 9/1991 | Chen |
| 5,060,537 A | 10/1991 | Nagano |
| 5,067,930 A | 11/1991 | Morales |
| D323,309 S | 1/1992 | Perry |
| 5,115,692 A | 5/1992 | Nagano |
| 5,121,935 A | 6/1992 | Mathieu et al. |
| 5,125,288 A | 6/1992 | Amiet |
| 5,125,489 A | 6/1992 | Cha |
| 5,179,873 A | 1/1993 | Girvin |
| 5,188,384 A | 2/1993 | van Raemdonck |
| 5,194,051 A | 3/1993 | Nagano |
| 5,195,397 A | 3/1993 | Nagano |
| 5,203,229 A | 4/1993 | Chen |
| 5,207,768 A | 5/1993 | Gluys |
| 5,209,581 A | 5/1993 | Nagano |
| 5,215,322 A | 6/1993 | Enders |
| 5,259,270 A | 11/1993 | Lin |
| 5,320,582 A | 6/1994 | Takeda |
| 5,324,100 A | 6/1994 | James |
| 5,326,331 A | 7/1994 | Hallock, III |
| 5,379,665 A | 1/1995 | Nagano |
| D355,872 S | 2/1995 | Haney |
| 5,419,218 A | 5/1995 | Romano |
| 5,423,233 A | 6/1995 | Peyre |
| 5,435,869 A | 7/1995 | Christensen |
| 5,451,071 A | 9/1995 | Pong et al. |
| 5,460,576 A | 10/1995 | Barnett |
| 5,496,222 A | 3/1996 | Kojima |
| 5,497,680 A | 3/1996 | Nagano |
| 5,503,600 A | 4/1996 | Berecz |
| 5,505,111 A | 4/1996 | Nagano |
| 5,522,282 A | 6/1996 | Nagano |
| 5,522,611 A | 6/1996 | Schmidt |
| 5,540,118 A | 7/1996 | Calendrille, Jr. |
| 5,544,907 A | 8/1996 | Lin et al. |
| 5,549,396 A | 8/1996 | Chiang |
| 5,620,384 A | 4/1997 | Kojima |
| 5,626,060 A | 5/1997 | Lin |
| 5,632,940 A | 5/1997 | Whatley |
| 5,644,953 A | 7/1997 | Leng |
| 5,676,616 A | 10/1997 | Hara |
| 5,679,084 A | 10/1997 | Daniels, III |

(56) References Cited

U.S. PATENT DOCUMENTS

| | | |
|---|---|---|
| 5,687,619 A | 11/1997 | Bryne |
| 5,725,450 A | 3/1998 | Huskey |
| 5,727,429 A | 3/1998 | Ueda |
| 5,728,018 A | 3/1998 | Terada |
| 5,765,450 A | 6/1998 | Kruger |
| 5,771,757 A | 6/1998 | Hanamura |
| 5,782,714 A | 7/1998 | Osgood |
| 5,788,593 A | 8/1998 | Tiong |
| 5,791,202 A | 8/1998 | Karsdon |
| 5,803,476 A | 9/1998 | Olson et al. |
| 5,806,379 A | 9/1998 | Nagano |
| 5,809,844 A | 9/1998 | Durham |
| 5,816,377 A | 10/1998 | Nakamura |
| 5,819,599 A | 10/1998 | Yamanaka |
| 5,846,148 A | 12/1998 | Fuji |
| 5,893,299 A | 4/1999 | Yamanaka |
| 5,927,155 A | 7/1999 | Jackson |
| 5,935,034 A | 8/1999 | Campagnolo |
| 5,941,135 A | 8/1999 | Schlanger |
| 5,943,795 A | 8/1999 | Ueda |
| 5,954,604 A | 9/1999 | Nakamura |
| 6,003,889 A | 12/1999 | Shalom |
| 6,014,913 A | 1/2000 | Masahiro |
| 6,014,914 A | 1/2000 | Ueda |
| 6,039,665 A | 3/2000 | Nakamura |
| 6,058,803 A | 5/2000 | Yamanaka |
| 6,059,171 A | 5/2000 | Yamanaka et al. |
| 6,059,378 A | 5/2000 | Dougherty |
| 6,060,982 A | 5/2000 | Holtrop |
| 6,083,132 A | 7/2000 | Walker |
| 6,095,691 A | 8/2000 | Chiang |
| 6,102,821 A | 8/2000 | Nakamura |
| 6,117,032 A | 9/2000 | Nankou |
| 6,165,092 A | 12/2000 | Bramham |
| 6,202,506 B1 | 3/2001 | Storck et al. |
| 6,203,459 B1 | 3/2001 | Calendrille, Jr. |
| 6,264,575 B1 | 7/2001 | Lim et al. |
| 6,266,990 B1 | 7/2001 | Shook et al. |
| 6,305,243 B1 | 10/2001 | Chiang |
| 6,314,834 B1 | 11/2001 | Smith et al. |
| 6,332,853 B1 | 12/2001 | Bowman |
| 6,354,973 B1 | 3/2002 | Barnett |
| 6,382,381 B1 | 5/2002 | Okajima et al. |
| 6,416,434 B1 | 7/2002 | Calendrille, Jr. |
| 6,428,437 B1 | 8/2002 | Schlanger |
| 6,488,603 B2 | 12/2002 | Lim et al. |
| 6,490,948 B2 | 12/2002 | Tanaka |
| 6,520,048 B2 | 2/2003 | Chen |
| 6,533,690 B2 | 3/2003 | Barnett |
| 6,564,675 B1 | 5/2003 | Jiang |
| 6,612,201 B1 | 9/2003 | Chen |
| 6,637,292 B2 | 10/2003 | Chu |
| 6,647,826 B2 | 11/2003 | Okajima |
| 6,725,742 B2 | 4/2004 | Bremer |
| 6,729,204 B1 | 5/2004 | Chen |
| 6,805,373 B2 | 10/2004 | Singenberger et al. |
| 6,848,700 B1 | 2/2005 | Fritschen |
| 6,988,427 B2 | 1/2006 | Yamanaka |
| 7,011,592 B2 | 3/2006 | Shahana et al. |
| 7,013,754 B2 | 3/2006 | Milanowski |
| 7,024,961 B2 | 4/2006 | Hsiao |
| D522,414 S | 6/2006 | Chen |
| 7,059,983 B2 | 6/2006 | Heim |
| 7,066,856 B1 | 6/2006 | Rogers |
| 7,066,857 B1 | 6/2006 | DeRosa |
| D524,195 S | 7/2006 | Neal |
| 7,108,428 B2 | 9/2006 | Ason |
| 7,118,505 B2 | 10/2006 | Lee |
| 7,131,656 B2 | 11/2006 | Valle |
| 7,174,807 B2 | 2/2007 | Bryne |
| 7,240,587 B2 | 7/2007 | Plassiard |
| 7,263,914 B2 | 9/2007 | Ording et al. |
| 7,334,500 B2 | 2/2008 | Tseng |
| 7,523,685 B2 | 4/2009 | French |
| 7,562,604 B2 | 7/2009 | Fukui |
| 7,610,832 B2 | 11/2009 | Dal Pra' |
| 7,650,817 B2 | 1/2010 | Shiraishi et al. |
| 7,753,157 B1 | 7/2010 | Woods |
| 7,770,492 B2 | 8/2010 | French |
| 7,775,128 B2 | 8/2010 | Roessingh et al. |
| 7,886,947 B2 | 2/2011 | Campagnolo |
| 7,931,553 B2 | 4/2011 | Tokuyama |
| 7,959,529 B2 | 6/2011 | Braedt |
| 8,024,993 B2 | 9/2011 | Dal Pra' et al. |
| 8,025,304 B2 | 9/2011 | Smith |
| 8,066,293 B2 | 11/2011 | Meggiolan |
| 8,197,371 B2 | 6/2012 | D'Aluisio |
| 8,235,849 B2 | 8/2012 | Carnston et al. |
| 8,267,417 B1 * | 9/2012 | Yamanaka ............ B62M 3/003 |
| | | 74/594.1 |
| 8,302,504 B2 | 11/2012 | Dal Pra' |
| 8,393,794 B1 * | 3/2013 | Shiraishi .............. B62K 19/34 |
| | | 384/458 |
| 8,413,769 B2 | 4/2013 | Thrash |
| 8,491,429 B2 | 7/2013 | Cranston et al. |
| 8,561,500 B2 | 10/2013 | D'Aluisio |
| 8,578,816 B2 | 11/2013 | Lin |
| 8,590,421 B2 | 11/2013 | Meggiolan et al. |
| 8,616,084 B2 | 12/2013 | Meggiolan |
| 8,641,151 B2 | 2/2014 | Kamada |
| 8,663,044 B2 | 3/2014 | Lin |
| 8,689,662 B2 | 4/2014 | Pasqua et al. |
| 8,707,823 B2 | 4/2014 | Dal Pra' |
| 8,770,061 B2 | 7/2014 | Meggiolan et al. |
| 8,820,192 B2 | 9/2014 | Staples et al. |
| 8,834,309 B2 | 9/2014 | Braedt |
| 8,863,616 B2 | 10/2014 | Ciavatta et al. |
| 8,888,629 B2 | 11/2014 | Ji |
| 8,911,314 B2 | 12/2014 | Braedt |
| 8,979,685 B2 | 3/2015 | Weagle |
| 9,003,921 B2 | 4/2015 | Weagle |
| 9,011,282 B2 | 4/2015 | Staples |
| 9,260,158 B2 | 2/2016 | Braedt |
| 9,458,871 B2 | 10/2016 | Ishizaki |
| 9,517,811 B1 * | 12/2016 | Shiraishi .............. B62K 19/34 |
| 10,160,030 B2 | 12/2018 | Earle et al. |
| 10,221,887 B2 | 3/2019 | Dubois et al. |
| 10,259,526 B2 | 4/2019 | Hsieh |
| 10,260,568 B2 | 4/2019 | Chen |
| 10,480,571 B2 | 11/2019 | Dubois et al. |
| 10,562,588 B2 | 2/2020 | Thrash et al. |
| 11,142,280 B2 | 10/2021 | Dubois et al. |
| 2001/0049976 A1 | 12/2001 | Dodman |
| 2002/0028719 A1 | 3/2002 | Yamanaka |
| 2002/0160869 A1 | 10/2002 | Barnett |
| 2002/0170382 A1 | 11/2002 | Yang |
| 2002/0194951 A1 | 12/2002 | Lowe |
| 2003/0029271 A1 | 2/2003 | Shuman |
| 2003/0041689 A1 | 3/2003 | Chu |
| 2003/0051576 A1 | 3/2003 | Muraoka |
| 2003/0064844 A1 | 4/2003 | Lin |
| 2003/0171180 A1 | 9/2003 | Shahana et al. |
| 2003/0183036 A1 | 10/2003 | Chou |
| 2003/0197346 A1 | 10/2003 | Singenberger et al. |
| 2004/0009835 A1 | 1/2004 | Heim |
| 2004/0037628 A1 | 2/2004 | Meggiolan |
| 2004/0162172 A1 * | 8/2004 | Yamanaka ............ B62M 3/003 |
| | | 474/160 |
| 2004/0182197 A1 | 9/2004 | Chiang |
| 2004/0187635 A1 | 9/2004 | Bryne |
| 2004/0200314 A1 | 10/2004 | Hermansen et al. |
| 2004/0211289 A1 | 10/2004 | Chiang et al. |
| 2004/0254038 A1 | 12/2004 | Chamberlain |
| 2005/0005729 A1 | 1/2005 | Chen |
| 2005/0012298 A1 | 1/2005 | Dal Pra et al. |
| 2005/0016323 A1 | 1/2005 | Dal Pra' |
| 2005/0022625 A1 | 2/2005 | Nonoshita |
| 2005/0032596 A1 | 2/2005 | Nonoshita et al. |
| 2005/0035571 A1 | 2/2005 | Huck |
| 2005/0081678 A1 | 4/2005 | Smith et al. |
| 2005/0081679 A1 | 4/2005 | Chen |
| 2005/0090349 A1 | 4/2005 | Lee |
| 2005/0145061 A1 | 7/2005 | Ording et al. |
| 2005/0178236 A1 | 8/2005 | Crozet et al. |

(56) References Cited

U.S. PATENT DOCUMENTS

| | | |
|---|---|---|
| 2005/0199092 A1 | 9/2005 | Feltrin et al. |
| 2005/0217417 A1 | 10/2005 | Uchida et al. |
| 2005/0252337 A1 | 11/2005 | Chen |
| 2005/0284253 A1 | 12/2005 | Hervig |
| 2006/0029317 A1 | 2/2006 | Yamamoto |
| 2006/0063624 A1 | 3/2006 | Voss |
| 2006/0066074 A1 | 3/2006 | Turner |
| 2006/0075846 A1 | 4/2006 | Valle |
| 2006/0081088 A1 | 4/2006 | Muraoka |
| 2006/0117905 A1* | 6/2006 | Yamanaka ............... B62M 3/00 74/594.1 |
| 2006/0169098 A1 | 8/2006 | Valle |
| 2006/0199690 A1 | 9/2006 | Gardner |
| 2006/0236809 A1 | 10/2006 | Bryne |
| 2006/0258499 A1 | 11/2006 | Kamada |
| 2006/0266154 A1 | 11/2006 | Hermansen |
| 2006/0288819 A1 | 12/2006 | Dal Pra' et al. |
| 2007/0034043 A1 | 2/2007 | Feltin |
| 2007/0049436 A1 | 3/2007 | Kamada |
| 2007/0062328 A1* | 3/2007 | Shiraishi ............... B62M 3/003 74/594.1 |
| 2007/0134456 A1 | 6/2007 | Fritschen |
| 2007/0137426 A1 | 6/2007 | Meggiolan et al. |
| 2007/0137432 A1 | 6/2007 | Chen |
| 2007/0182122 A1 | 8/2007 | Smith |
| 2007/0199403 A1 | 8/2007 | Ciavatta et al. |
| 2007/0204720 A1 | 9/2007 | Poyzer |
| 2007/0204722 A1 | 9/2007 | Dal Pra |
| 2007/0207631 A1 | 9/2007 | Meggiolan et al. |
| 2007/0222172 A1 | 9/2007 | Chen |
| 2007/0235986 A1 | 10/2007 | Weagle |
| 2007/0241530 A1* | 10/2007 | Nonoshita ............... B62M 3/00 280/259 |
| 2007/0254758 A1 | 11/2007 | Chen |
| 2007/0283781 A1 | 12/2007 | Meggiolan |
| 2007/0284782 A1 | 12/2007 | Dal Pra' |
| 2007/0289406 A1 | 12/2007 | French |
| 2007/0289407 A1 | 12/2007 | French |
| 2008/0004143 A1 | 1/2008 | Kanehisa |
| 2008/0005905 A1 | 1/2008 | Valle et al. |
| 2008/0058144 A1 | 3/2008 | Oseto et al. |
| 2008/0152460 A1 | 6/2008 | Watanabe |
| 2008/0224440 A1 | 9/2008 | Masuda et al. |
| 2008/0231014 A1 | 9/2008 | Braedt |
| 2008/0234082 A1 | 9/2008 | Braedt |
| 2008/0272572 A1 | 11/2008 | Tsai |
| 2008/0289927 A1 | 11/2008 | Ji |
| 2008/0307652 A1 | 12/2008 | Chiang |
| 2008/0314193 A1* | 12/2008 | Meggiolan ............... B62M 3/00 74/594.1 |
| 2009/0042682 A1 | 2/2009 | Dal Pra |
| 2009/0056495 A1 | 3/2009 | Bischoff et al. |
| 2009/0056496 A1 | 3/2009 | Dodman et al. |
| 2009/0078081 A1 | 3/2009 | French |
| 2009/0095122 A1 | 4/2009 | Weagle |
| 2009/0145262 A1 | 6/2009 | Pasqua et al. |
| 2009/0151509 A1 | 6/2009 | French |
| 2009/0191996 A1 | 7/2009 | D'Aluisio |
| 2009/0236777 A1 | 9/2009 | Chiang |
| 2009/0243250 A1 | 10/2009 | Chiang |
| 2009/0261553 A1 | 10/2009 | Meggiolan |
| 2010/0009794 A1 | 1/2010 | Chiang |
| 2010/0058889 A1 | 3/2010 | Dal Pra |
| 2010/0064845 A1 | 3/2010 | French |
| 2010/0099530 A1 | 4/2010 | Chiang et al. |
| 2010/0229675 A1 | 9/2010 | Dodman et al. |
| 2010/0236356 A1 | 9/2010 | Dodman |
| 2010/0275724 A1 | 11/2010 | Staples et al. |
| 2010/0295265 A1 | 11/2010 | Burdick |
| 2011/0011202 A1 | 1/2011 | Lin |
| 2011/0105263 A1 | 5/2011 | Braedt |
| 2011/0130233 A1 | 6/2011 | Tokuyama |
| 2011/0140390 A1* | 6/2011 | Kuroiwa ............... B62M 3/003 280/261 |
| 2011/0204201 A1 | 8/2011 | Kodama |
| 2011/0290069 A1 | 12/2011 | Lin |
| 2012/0067675 A1 | 3/2012 | Thrash |
| 2012/0119565 A1 | 5/2012 | Kamada |
| 2012/0225745 A1 | 9/2012 | Oishi |
| 2012/0260767 A1 | 10/2012 | D'Aluisio |
| 2012/0302384 A1 | 11/2012 | Braedt |
| 2013/0053195 A1 | 2/2013 | Emura et al. |
| 2013/0053196 A1 | 2/2013 | Emura et al. |
| 2013/0068066 A1 | 3/2013 | Staples et al. |
| 2013/0114999 A1 | 5/2013 | Ostling |
| 2013/0225343 A1 | 8/2013 | Spahr et al. |
| 2014/0157951 A1 | 6/2014 | Dubois et al. |
| 2014/0179474 A1 | 6/2014 | Florczyk |
| 2014/0345419 A1 | 11/2014 | Staples et al. |
| 2015/0020621 A1* | 1/2015 | Kawakami ............... B62M 6/60 74/47 |
| 2015/0024884 A1 | 1/2015 | Braedt |
| 2015/0210353 A1 | 7/2015 | Tokuyama et al. |
| 2016/0167737 A1 | 6/2016 | Tokuyama |
| 2016/0176447 A1 | 6/2016 | Bernardele |
| 2016/0236749 A1 | 8/2016 | Cody |
| 2016/0272002 A1 | 9/2016 | Earle |
| 2017/0057598 A1 | 3/2017 | Thrash et al. |
| 2017/0101124 A1 | 4/2017 | Assmann |
| 2017/0274960 A1 | 9/2017 | Dubois et al. |
| 2017/0314665 A1 | 11/2017 | Garcia |
| 2018/0022415 A1 | 1/2018 | Oishi |
| 2018/0148126 A1* | 5/2018 | Tetsuka ............... B62J 45/421 |
| 2018/0170478 A1* | 6/2018 | Furuya ............... F16D 1/068 |
| 2018/0257742 A1 | 9/2018 | Chen |
| 2018/0297664 A1 | 10/2018 | Fukumori |
| 2018/0334212 A1 | 11/2018 | Bowers |
| 2018/0346064 A1 | 12/2018 | Fijita |
| 2019/0054765 A1 | 2/2019 | Thrash |
| 2019/0093749 A1 | 3/2019 | Bisarello |
| 2019/0154083 A1 | 5/2019 | Dubois et al. |
| 2019/0233051 A1 | 8/2019 | Carrasco Vergara |
| 2019/0241233 A1 | 8/2019 | Tavarase Miranda |
| 2020/0140034 A1 | 5/2020 | Thrash et al. |
| 2020/0354016 A1 | 11/2020 | Di Serio |
| 2021/0094642 A1* | 4/2021 | Dubois ............... B62J 1/08 |
| 2021/0171153 A1* | 6/2021 | Nichols ............... G01L 3/108 |
| 2024/0043090 A1* | 2/2024 | Caillaud ............... F16H 63/304 |

FOREIGN PATENT DOCUMENTS

| | | |
|---|---|---|
| CN | 1080902 A | 1/1994 |
| CN | 2169593 A | 6/1994 |
| CN | 2170254 Y | 6/1994 |
| CN | 2183329 A | 11/1994 |
| CN | 2188541 Y | 2/1995 |
| CN | 2206250 Y | 8/1995 |
| CN | 2210849 Y | 10/1995 |
| CN | 1112068 A | 11/1995 |
| CN | 2277928 Y | 4/1998 |
| CN | 2279303 A | 4/1998 |
| CN | 1186751 A | 7/1998 |
| CN | 2409135 Y | 12/2000 |
| CN | 2409136 Y | 12/2000 |
| CN | 2428396 Y | 5/2001 |
| CN | 2434218 Y | 6/2001 |
| CN | 1330015 A | 1/2002 |
| CN | 2470233 Y | 1/2002 |
| CN | 2478916 Y | 2/2002 |
| CN | 1342562 A | 4/2002 |
| CN | 2509074 Y | 9/2002 |
| CN | 1439567 A | 9/2003 |
| CN | 1453179 A | 11/2003 |
| CN | 1463881 A | 12/2003 |
| CN | 2683516 Y | 3/2005 |
| CN | 1663872 A | 9/2005 |
| CN | 2749776 Y | 1/2006 |
| CN | 2782543 Y | 5/2006 |
| CN | 2806294 Y | 8/2006 |
| CN | 1864888 A | 11/2006 |
| CN | 1907802 A | 2/2007 |
| CN | 1927649 A | 3/2007 |
| CN | 101054105 A | 10/2007 |

(56) References Cited

FOREIGN PATENT DOCUMENTS

| | | | | |
|---|---|---|---|---|
| CN | 200995764 Y | 12/2007 | | |
| CN | 100379506 C | 4/2008 | | |
| CN | 201179942 Y | 1/2009 | | |
| CN | 201712753 U | 1/2011 | | |
| CN | 201863981 U | 6/2011 | | |
| CN | 102372065 A | 3/2012 | | |
| CN | 103129585 A | 3/2012 | | |
| CN | 202670040 U | 1/2013 | | |
| CN | 202827970 U | 3/2013 | | |
| CN | 203078709 U | 7/2013 | | |
| CN | 203111435 U | 8/2013 | | |
| CN | 103448859 A | 12/2013 | | |
| CN | 203410583 U | 1/2014 | | |
| CN | ZL 2016800500067 | 5/2021 | | |
| DE | 2655447 A1 | 6/1977 | | |
| DE | 3017771 A1 | 11/1981 | | |
| DE | 4002574 A1 | 1/1991 | | |
| DE | 9408910.8 U1 | 9/1994 | | |
| DE | 29600548 U1 | 4/1996 | | |
| DE | 19601125 A1 | 7/1997 | | |
| DE | 29623671 U1 | 4/1999 | | |
| DE | 19751879 A1 | 5/1999 | | |
| DE | 19755950 A1 | 6/1999 | | |
| DE | 10032778 A1 | 1/2002 | | |
| DE | 20116764 U1 | 1/2002 | | |
| DE | 10342638 A1 | 7/2005 | | |
| DE | 102006015582 A1 * | 10/2007 | ............ | F16J 15/3268 |
| DE | 202008004243 U1 | 7/2008 | | |
| DE | 102007028897 A1 | 1/2009 | | |
| DE | 102009006101 A1 | 7/2009 | | |
| DE | 102016002706 A1 | 9/2017 | | |
| DE | 10201621865 A1 | 12/2017 | | |
| DE | 202018103890 U1 * | 11/2019 | ............. | B60B 27/02 |
| EP | 0 012 568 A1 | 6/1980 | | |
| EP | 0510371 A1 | 10/1992 | | |
| EP | 0663334 A1 | 7/1995 | | |
| EP | 0765802 A2 | 4/1997 | | |
| EP | 0765802 A3 | 4/1997 | | |
| EP | 0766017 A1 | 4/1997 | | |
| EP | 0898542 B1 | 5/1997 | | |
| EP | 0849153 B1 | 12/1997 | | |
| EP | 0834450 A1 | 4/1998 | | |
| EP | 0849154 A2 | 6/1998 | | |
| EP | 0849155 A2 | 6/1998 | | |
| EP | 0765802 B1 | 7/1999 | | |
| EP | 1043221 A2 | 10/2000 | | |
| EP | 1074462 A2 | 2/2001 | | |
| EP | 1120336 A2 * | 8/2001 | ............. | B62M 3/00 |
| EP | 1270393 B1 | 1/2003 | | |
| EP | 1281609 B1 | 2/2003 | | |
| EP | 1378430 A1 | 1/2004 | | |
| EP | 1378433 A1 | 1/2004 | | |
| EP | 1407962 A1 | 4/2004 | | |
| EP | 1419961 A1 | 5/2004 | | |
| EP | 1422134 A2 | 5/2004 | | |
| EP | 1439117 A2 | 7/2004 | | |
| EP | 1439118 A2 | 7/2004 | | |
| EP | 1616781 A1 | 1/2006 | | |
| EP | 1688345 A2 | 8/2006 | | |
| EP | 1792821 A1 | 6/2007 | | |
| EP | 1818251 A1 | 8/2007 | | |
| EP | 1964769 A2 | 9/2008 | | |
| EP | 1964769 A3 | 9/2008 | | |
| EP | 1 995 166 A2 | 11/2008 | | |
| EP | 2006199 A2 * | 12/2008 | ............. | B62M 3/00 |
| EP | 2022713 A2 | 2/2009 | | |
| EP | 2042422 A2 | 4/2009 | | |
| EP | 2045181 A2 | 4/2009 | | |
| EP | 2048075 A2 | 4/2009 | | |
| EP | 2165927 A1 | 3/2010 | | |
| EP | 1486413 B1 | 4/2010 | | |
| EP | 2441656 A1 | 4/2011 | | |
| EP | 1818252 B1 | 9/2011 | | |
| EP | 1820726 B1 | 9/2011 | | |
| EP | 2311718 B1 | 10/2011 | | |
| EP | 2412620 A1 | 2/2012 | | |
| EP | 1669285 B1 | 4/2012 | | |
| EP | 1486412 B1 | 5/2014 | | |
| EP | 1342657 B2 | 10/2014 | | |
| EP | 3 109 062 A1 | 12/2015 | | |
| FR | 1027817 | 5/1953 | | |
| FR | 1384356 | 2/1975 | | |
| FR | 2588236 | 10/1986 | | |
| FR | 2612870 | 3/1988 | | |
| FR | 2780698 | 1/2000 | | |
| GB | 1031337 | 6/1966 | | |
| GB | 1281731 | 7/1972 | | |
| GB | 1361394 | 7/1974 | | |
| GB | 1431308 | 4/1976 | | |
| GB | 2177628 A | 1/1987 | | |
| GB | 2225296 A | 5/1990 | | |
| GB | 2289507 A | 11/1995 | | |
| JP | 5412663 | 1/1979 | | |
| JP | 59165293 | 6/1984 | | |
| JP | 526785 | 4/1993 | | |
| JP | 1995-002157 | 1/1995 | | |
| JP | 10181669 A | 7/1998 | | |
| JP | 3196695 | 6/2001 | | |
| JP | 3248675 | 11/2001 | | |
| JP | 3108527 | 9/2005 | | |
| JP | 2007-223586 | 9/2007 | | |
| JP | 2008189254 A | 8/2008 | | |
| JP | 2009-12766 | 1/2009 | | |
| JP | 2009293677 A * | 12/2009 | ............. | F16C 33/783 |
| JP | 2011-93526 | 5/2011 | | |
| JP | 2012-171419 | 9/2012 | | |
| JP | 2017035926 A | 2/2017 | | |
| JP | 2019142351 A * | 8/2019 | ............. | H01L 24/78 |
| JP | 2020199878 A * | 12/2020 | ............. | B62M 6/55 |
| KR | 10-2011-0075299 | 7/2011 | | |
| KR | 10-2012-0111687 | 10/2012 | | |
| KR | 10-1346783 | 12/2013 | | |
| NL | 1015666 | 1/2001 | | |
| NL | 2005745 | 5/2012 | | |
| NZ | 598054 | 5/2013 | | |
| SK | 1032-95 | 2/1996 | | |
| SK | 280106 | 6/1999 | | |
| TW | 448114 | 6/1989 | | |
| TW | 461866 | 6/1989 | | |
| TW | 500679 | 1/1990 | | |
| TW | 498039 | 7/1990 | | |
| TW | 499380 | 10/1990 | | |
| TW | 548158 | 10/1990 | | |
| TW | 527254 | 5/1991 | | |
| TW | 200800717 | 6/1995 | | |
| TW | I288100 | 6/1995 | | |
| TW | M324029 | 3/1996 | | |
| TW | 200846243 | 5/1996 | | |
| TW | I363725 | 5/1996 | | |
| TW | 284731 | 9/1996 | | |
| TW | 200922834 | 11/1996 | | |
| TW | M337531 | 11/1996 | | |
| TW | 200932621 | 8/1998 | | |
| TW | M264208 | 5/2005 | | |
| TW | I275525 | 12/2005 | | |
| TW | I291428 B * | 12/2007 | ............. | B62M 3/00 |
| TW | 201026555 A1 | 7/2010 | | |
| TW | 201029769 A1 | 8/2010 | | |
| TW | M386236 | 8/2010 | | |
| TW | I351327 B1 | 11/2011 | | |
| TW | 201204597 A1 | 2/2012 | | |
| TW | M458370 U1 | 8/2013 | | |
| TW | I411554 B | 10/2013 | | |
| TW | I411555 B | 10/2013 | | |
| TW | 201422482 A | 6/2014 | | |
| TW | 201507920 | 3/2015 | | |
| TW | M576558 | 4/2019 | | |
| TW | I708709 B | 11/2020 | | |
| WO | 89/08039 | 8/1989 | | |
| WO | 96/03306 | 2/1996 | | |
| WO | 99/54193 | 10/1999 | | |
| WO | 01/72578 A1 | 10/2001 | | |
| WO | 02/32751 A2 | 4/2002 | | |
| WO | 03/000543 A1 | 1/2003 | | |

(56) References Cited

FOREIGN PATENT DOCUMENTS

| WO | 2004/080786 A2 | 9/2004 |
|---|---|---|
| WO | 2004/094218 A2 | 11/2004 |
| WO | 2012/065256 A1 | 5/2012 |
| WO | 2012/069389 A1 | 5/2012 |
| WO | 2017/040047 A1 | 3/2017 |
| WO | 2017040047 A1 | 3/2017 |
| WO | 2017165226 A1 | 9/2017 |
| WO | 2019040340 A1 | 2/2019 |
| WO | 2022015790 A1 | 1/2022 |

OTHER PUBLICATIONS

Machine Translation of TW-I291428-B.*
Machine Translation of JP-2020199878-A.*
Machine Translation of JP-2009293677-A.*
Machine Translation of DE 10 2006 015 582.*
STIC translation of "Patent rejection approval letter from the Intellectual Property Bureau of the Ministry of Economic Affairs" dated Jun. 26, 2023 of the Taiwanese Patent Application No. 109133450. (Year: 2023).*
Define middle, Microsoft Bing, Nov. 11, 2023 (Year: 2023).*
Translation of DE-202018103890-U1, Nov. 14, 2019 (Year: 2019).*
The office action from the Taiwan Application No. 109133450 dated Jan. 5, 2022.
International Search Report, dated Jun. 9, 2022, for International Application No. PCT/US22/21360.
EP Official Letter dated Mar. 4, 2022 in European Application No. 16 842 566.8-1009.
Office Action dated Mar. 14, 2022 in Chinese Application No. 201880064395.8.
The Notice of Allowance dated Nov. 15, 2021 from the Chinese Patent Application No. 201780017990.1.
The Official Letter dated Jul. 28, 2021 from the Chinese Patent Application No. 201780017990.1.
The office action from the Taiwan Application No. 106109159 dated Nov. 26, 2021.
The International Search Report with Written Opinion dated Nov. 10, 2021, from the PCT Patent Application No. PCT/US2021/041529.
The Second Office Action dated Oct. 22, 2021 from the Chinese Patent Application No. 201880064395.8.
The Examination Notification dated Jun. 28, 2022 for Taiwanese Application No. 107129023.
Real Designs CNC Cassette piece.
3668 effetti.jpg.
3671 efetti.jpg.
CTC10-rear.jpg.
Edco Monoblock 31.jpg.
Freewheel039_36A12-38 w splined interface.jpg.
FreewheelProCompe13_IMG_1826.jpg.
P1000874 real cassette.jpg.
Real designs cassette.jpg.
Sram_rednew-cassette.143.jpg.
Tioga.jpg.
Mountain Cycle Catalog 2000, www.MountainCycle.com.
Mountain Bike Action Magazine, Oct. 2000, pp. 38-40, www.mbaction.com.
Mountain Cycle Shockwave—Photos.
Mountain Bike Action Magazine 2000, p. 138, www.mbaction.com.
Mountain Cycle Universal Chainguide Instructions, www.mountaincycle.com.
2001 Gizmo Installation Instructions, web.archive.org/web/20011025172447/http://mrdirt.com/gizmo/page4.htm.
Mr.Dirt Gizmo Pictures.
2006 Race Face Interbike(Trade Show)Booth, www.bikemagic.com.
Raceface Diabolous Chainguide Instructions.
Decline Magazine, Issue 20, Article "Its the New Style", Jan. Feb. 2006.
Diabolus Chainguide actual Product Photos.
International Search Report from PCT/US2017/023016.
The Taiwanese Office Action dated Jun. 29, 2020 for the Taiwanese Patent Application No. 105126399.
The Taiwanese Examination Notification dated Jul. 31, 2020 for the Taiwanese Patent Application No. 106109159.
The European Search Report dated Apr. 1, 2019 for the European Patent Application No. 106842566.8.
The International Search Report and Written Opinion dated Nov. 9, 2018 for the International Application No. PCT/US2018/46952.
The European Search Report dated Jun. 13, 2019 for the European Patent Application No. 17 77 0865.
Machine translation of DE 19751879 obtained on Dec. 6, 2018.
The Chinese Office Action dated Apr. 29, 2020 for the Chinese Patent Application No. 2016800500067.
The Taiwanese Office Action dated Jan. 9, 2020 for the Taiwanese Patent Application No. 105126339.
The Chinese Office Action dated Feb. 3, 2020 for the Chinese Patent Application No. 201780017990.01.
The International Preliminary Report on Patentability for the PCT Application : PCT/US2017/023016.
The International Preliminary Report for the PCT Application : PCT/US2018/046952 dated Mar. 5, 2020.
The European Office Action dated Mar. 5, 2020 for the European Patent Application No. 16 842 566.8.
The Taiwanese Office Action dated Jun. 29, 2020 for the Taiwan Patent Application No. 105126399.
The Taiwanese Examination Notification dated Jul. 31, 2020 for the Taiwan Patent Application No. 106109159.
The Second Office Action dated Sep. 14, 2020 for the Taiwan Patent Application No. 201780017990.1.
The Official Letter dated Dec. 1, 2020 from the European Patent Application No. 16842533.8.
The Notice to Grant dated Feb. 19, 2021 from the Chinese Patent Application No. 201680050006.7.
The Chinese Notice of Examination dated Mar. 1, 2021 from the Chinese Patent Application No. 201880064395.8.
The European Search Report dated Mar. 16, 2021 for the European Patent Application No. EP 18 84 8212.
The Chinese Office Action dated Mar. 30, 2021 for the Chinese Application No. 201780017990.01.
The Official Letter dated Apr. 5, 2023 from the European Patent Application No. EP18848212.9.
The International Preliminary Report dated Oct. 5, 2023 from the International Patent Application No. PCT/US2022/021360.
The International Preliminary Report on Patentability for PCT Application No. PCT/US2021/041529.
The Official Letter dated Oct. 6, 2022 for European Application No. 17770865.8.
The Notice of Allowance dated Sep. 14, 2023 from the Taiwanese Patent Application No. 107129023.
Invention Patent Decision dated Oct. 24, 2022 of the Intellectual Property Office of the Ministry of Economic Affairs in Taiwan Application No. 109133450.

* cited by examiner

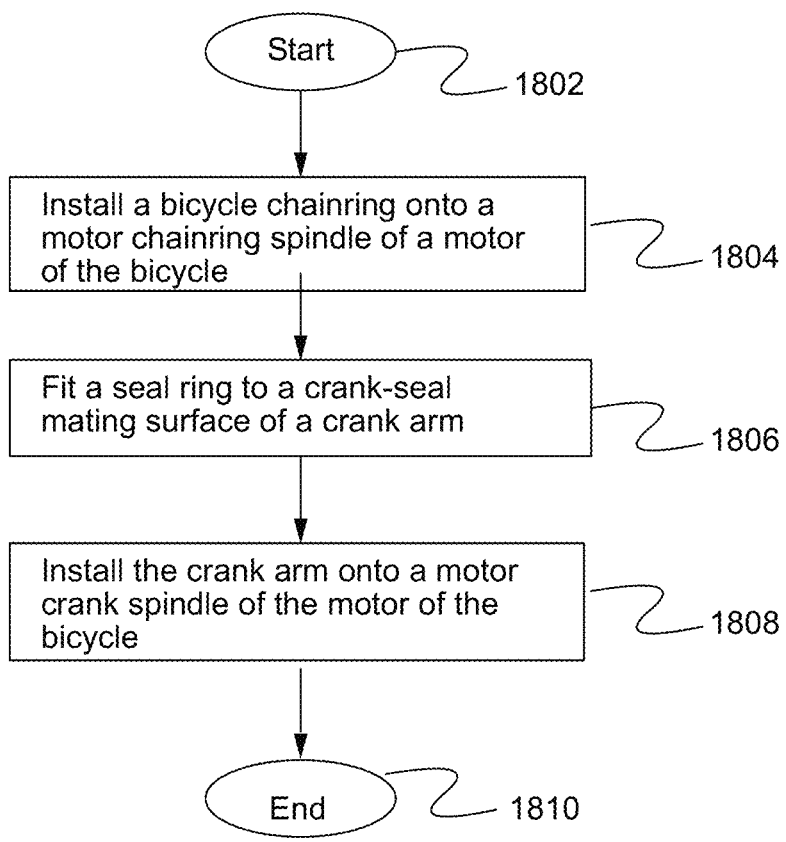

SEAL FOR BICYCLE CRANK WITH DIFFERENTIAL CHAINRING MOTION

FIELD OF THE INVENTION

The present invention is generally directed to a sealing device for a bicycle crank and chainring. More specifically, the present invention is directed to a sealing device for protecting parts of a bicycle drivetrain from environmental intrusion and contamination while riding the bicycle.

BACKGROUND OF THE INVENTION

In some traditional bicycle construction, the front chain drive sprocket ("chainring") or a set of multiple chainrings are rigidly attached directly to the drive-side bicycle crank arm, such that the chainring and crank arm rotate together. In this way pressure applied to the bicycle pedals, which are attached to the crank arms, generates tension in the drive chain through mechanical coupling of the crank arm to the chainring.

Many newer bicycles utilize a drivetrain arrangement where the chainring which activates the drive chain is able to rotate independently from the crank arms and crank spindle. In this arrangement, the supporting spindle for the crank arms passes through a hollow larger spindle which supports the chainring independently from the crank arm.

In some bicycles, this allows a gear arrangement between the crank spindle and the chainring spindle to drive the chainring indirectly, such that different gear ratios may be developed between the two for low speed or high speed operation. A second alternate configuration allows a gear train in combination with an electric motor to be arranged between the crank spindle and the chainring spindle, so that the rider's input power via the pedals may be augmented by the electric motor, allowing the bicycle to travel faster than a non-electrified bicycle could.

The concentric shafts in these arrangements present a new and unusual sealing problem for the bicycle designer, to prevent dust, dirt, water and debris present in the riding environment from contaminating the bearings and other components inside the bicycle gearbox or electric motor unit.

Consequently there is a need for a new sealing device to suit this new and unique configuration of parts on these modern bicycles.

SUMMARY OF THE INVENTION

A seal for a bicycle drivetrain is configured to shield and protect part of the bicycle drivetrain from contamination by materials commonly found in the cycling environment, namely dirt, oil, water and other debris found on cycling surfaces. The seal is configured to shield the bicycle drivetrain from grit that may foul lockring interfaces, leading to seized threads, and cause difficulty removing the lock ring when it comes time to service the motor or replace the chainring.

In a first aspect, a bicycle drive assembly comprises a bicycle motor comprising a motor chainring spindle and a motor crank spindle, a bicycle chainring installed onto the motor chainring spindle, a drive side crank arm installed onto the motor crank spindle and a seal ring fitted to a crank-seal mating surface of the drive side crank arm. In some embodiments, the motor chainring spindle and the motor crank spindle are concentric about a crank spindle axis of the bicycle drive assembly. In some embodiments, one or more crank seal retention lips of the seal ring mate with one or more arm seal grooves of the drive side crank arm to fit the seal ring to the drive side crank arm. In further embodiments, a crank slot tab of the seal ring fills a clamp slot space of the drive side crank to provide a complete seal at the bicycle chainring. In some of these embodiments, the crank slot tab prevents rotation of the seal ring relative to the drive side crank arm about the crank spindle axis. In some embodiments, the drive side crank arm is fitted to the motor crank spindle by one or more arm clamp screws and an arm retention screw. In some embodiments, the seal ring is retained to the drive side crank arm by one of a toothed shape and a splined shape formed into the seal-crank mating surface, to prevent rotation between the crank arm and the seal ring. In further embodiments, the seal ring is retained on the crank arm by one of a separate snap ring, a screw, a nut, and a fastener that prevents the seal ring from dislodging once it has been pressed onto the drive side bicycle crank arm.

In another aspect, a seal ring configured for fitting to a crank arm of a bicycle for preventing environmental intrusion from contaminating a drive assembly of the bicycle comprises a seal through-hole, a seal-crank mating face for fitting to a crank seal mating surface of the crank arm, one or more seal crank retention lips for mating with one or more arm seal grooves of the crank arm and a seal crank slot tab. In some embodiments, the crank slot tab of the seal ring fills a clamp slot space of the crank arm to provide a complete seal at the bicycle chainring. In some embodiments, the crank slot tab prevents rotation of the seal ring relative to the drive side crank arm about the crank spindle axis. In further embodiments, the seal ring is retained to the crank arm by one of a toothed shape and a splined shape formed into the seal-crank mating surface, to prevent rotation between the crank arm and the seal ring. In some embodiments, the seal ring is retained on the crank arm by one of a separate snap ring, a screw, a nut, and a fastener that prevents the seal ring from dislodging once it has been pressed onto the crank arm. In some embodiments, the crank arm comprises a drive side crank arm. In some embodiments, the bicycle comprises a motor.

In a further aspect, a method of protecting a bicycle drive assembly from contamination comprises installing a bicycle chainring onto a motor chainring spindle of a motor of the bicycle, fitting a seal ring to a crank-seal mating surface of a crank arm and installing the crank arm onto a motor crank spindle of the motor of the bicycle. In some embodiments, the motor chainring spindle and the motor crank spindle are concentric about a crank spindle axis of the bicycle drive assembly. In some embodiments, one or more crank seal retention lips of the seal ring mate with one or more arm seal grooves of the drive side crank arm to fit the seal ring to the drive side crank arm. In further embodiments, a crank slot tab of the seal ring fills a clamp slot space of the drive side crank to provide a complete seal at the bicycle chainring. In some embodiments, the crank slot tab prevents rotation of the seal ring relative to the drive side crank arm about the crank spindle axis. In some embodiments, the crank arm is fitted to the motor crank spindle by one or more arm clamp screws and an arm retention screw. In some embodiments, the crank arm comprises a drive side crank arm.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 18 illustrates a method of protecting a bicycle drive assembly from contamination, in accordance with some embodiments.

DETAILED DESCRIPTION OF THE EMBODIMENTS

Embodiments of the application are directed to a seal for a bicycle drivetrain that is configured to shield and protect part of the bicycle drivetrain from contamination by materials commonly found in the cycling environment, namely dirt, oil, water and other debris found on cycling surfaces. The seal is configured to shield the bicycle drivetrain from grit that may foul lockring interfaces, leading to seized threads, and cause difficulty removing the lock ring when it comes time to service the motor or replace the chainring.

Reference will now be made in detail to implementations of a seal for a bicycle crank with differential chainring motion, such as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
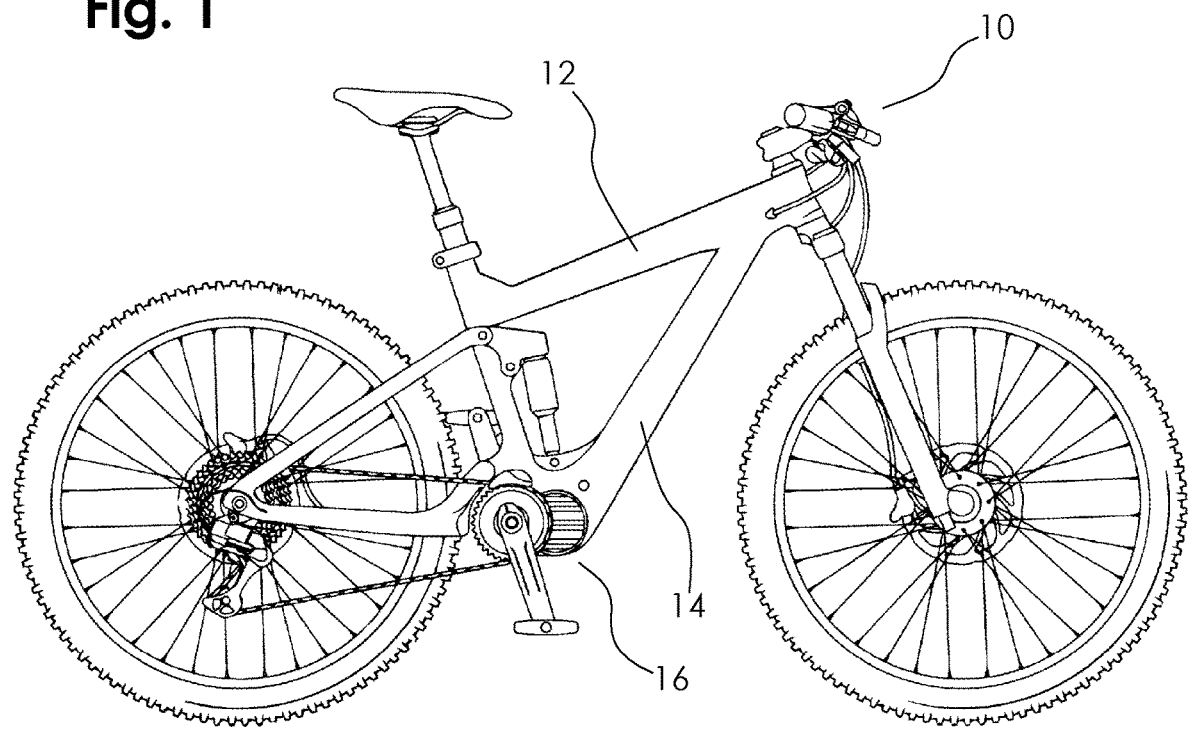
FIG. 1 illustrates a right side view of a complete bicycle assembly, in accordance with some embodiments.

Referring now to FIG. 1, a first complete bicycle assembly 10 is shown from the right side view for reference. Said first complete bicycle assembly 10 includes a first bicycle frame 12, a first bicycle battery 14, and a first bicycle motor 16.

Figure 2:
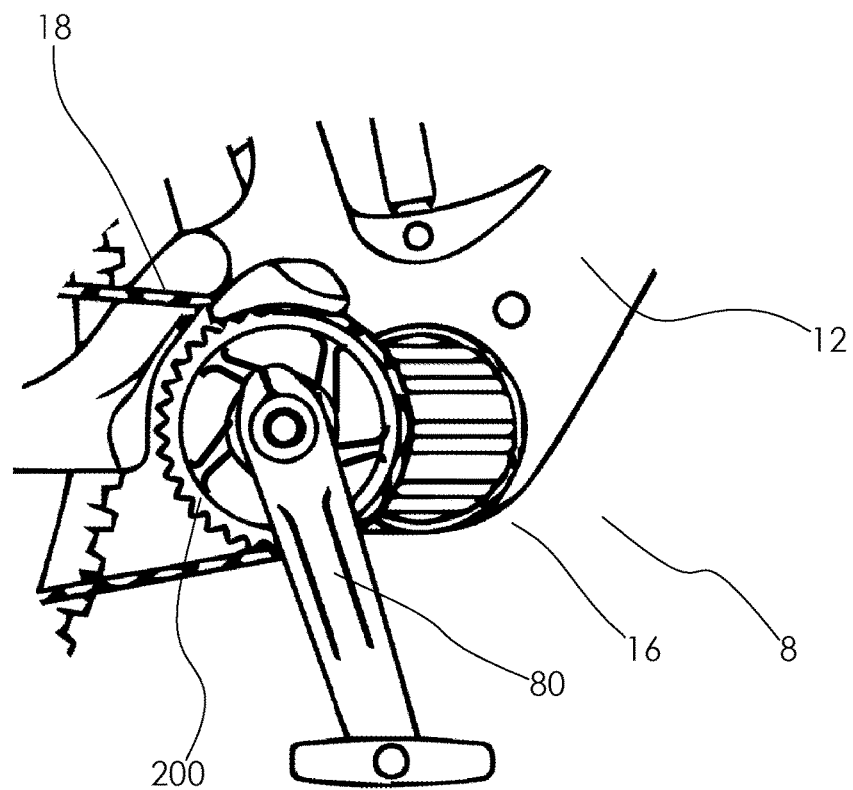
FIG. 2 illustrates a detailed view of a bicycle assembly with a bicycle drive assembly installed on the bicycle frame, in accordance with some embodiments.

FIG. 2 shows a detailed view of said first complete bicycle assembly 10 with bicycle drive assembly 8 installed on the first bicycle frame 12, and shows a typical bicycle chain 18, and a bicycle motor 16. The view indicates bicycle chainring 200 and drive side crank arm 80. To propel the bicycle, a rider would apply a cyclical force to the crankset through pedals (not shown), causing the chainring to rotate and apply tension to the chain.

Figure 3:
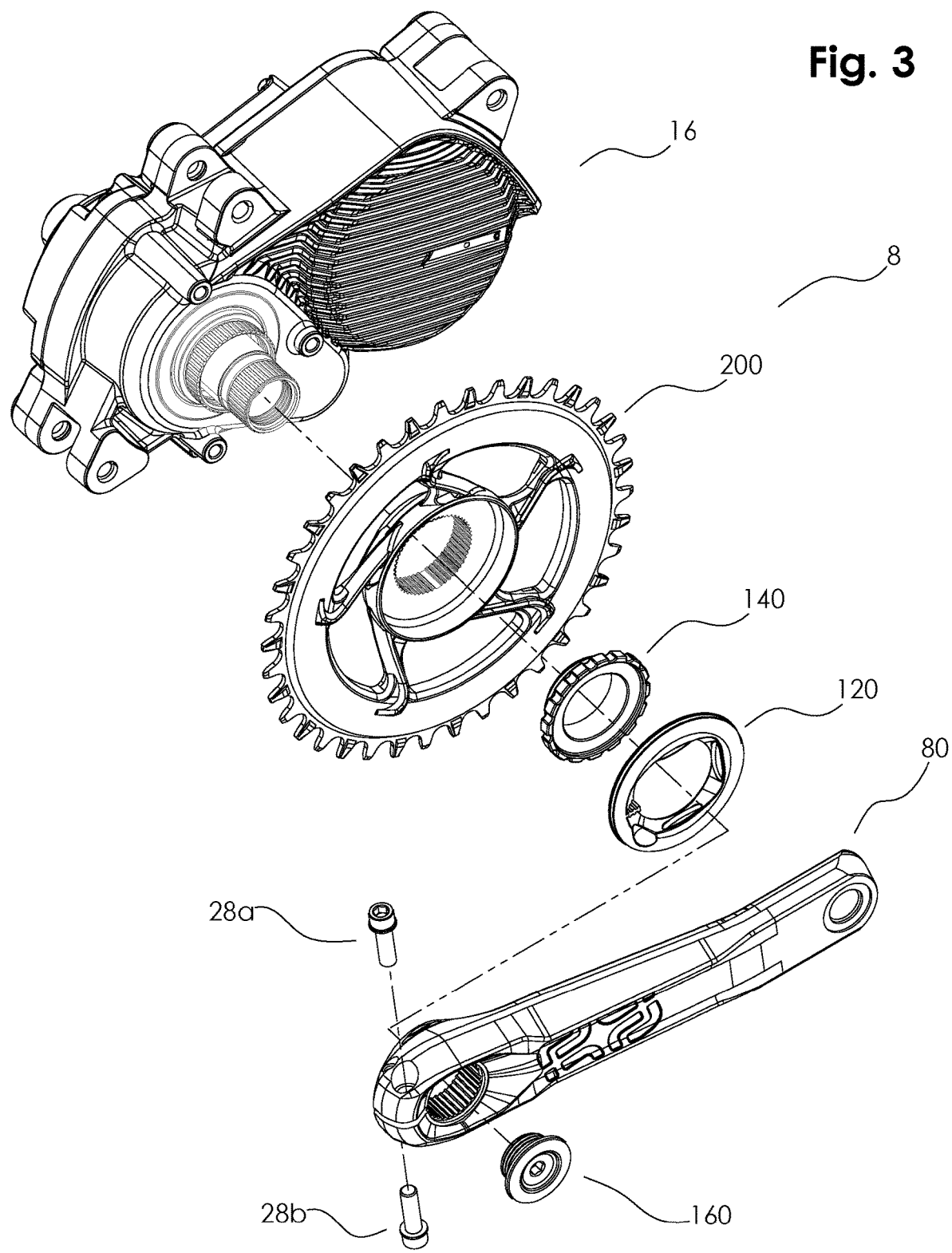
FIG. 3 illustrates an exploded view of the bicycle drive assembly, in accordance with some embodiments.

FIG. 3 shows an exploded view of the bicycle drive assembly 8, including bicycle motor 16, bicycle chainring 200, chainring lockring 140, seal ring 120, drive side crank arm 80, arm clamp screws 28*a* and 28*b*, and arm retention screw 160.

Figure 4:
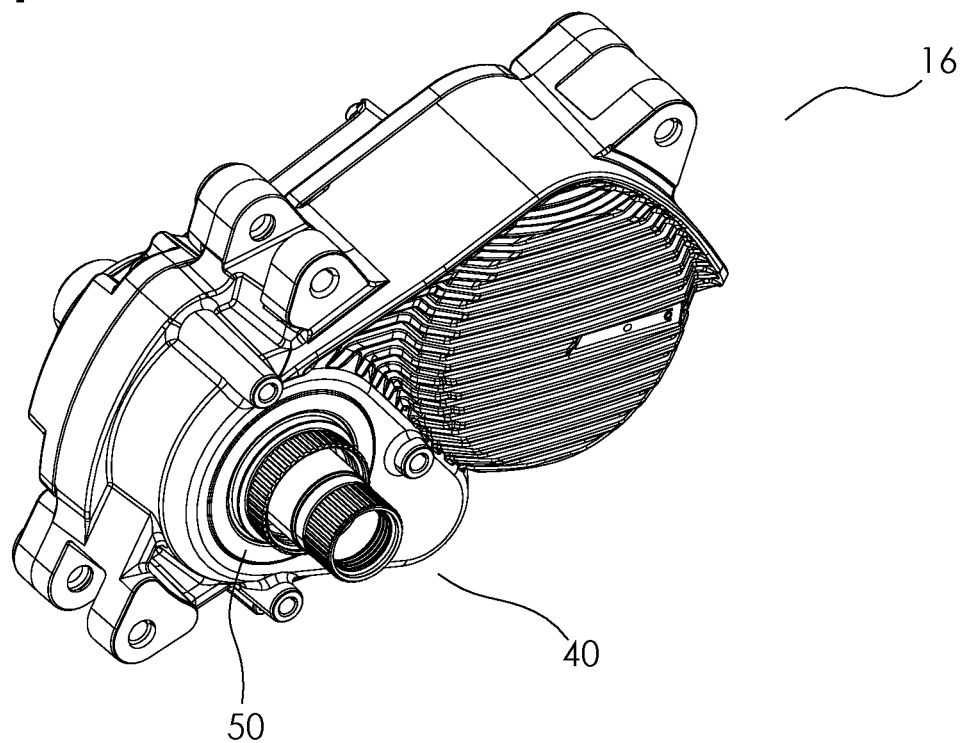
FIG. 4 illustrates a right 3rd angle view of a bicycle motor, a motor crank spindle and motor chainring spindle, in accordance with some embodiments.

FIG. 4 is a right 3rd angle view of said bicycle motor 16 indicating motor crank spindle 40 and motor chainring spindle 50.

Figure 5:
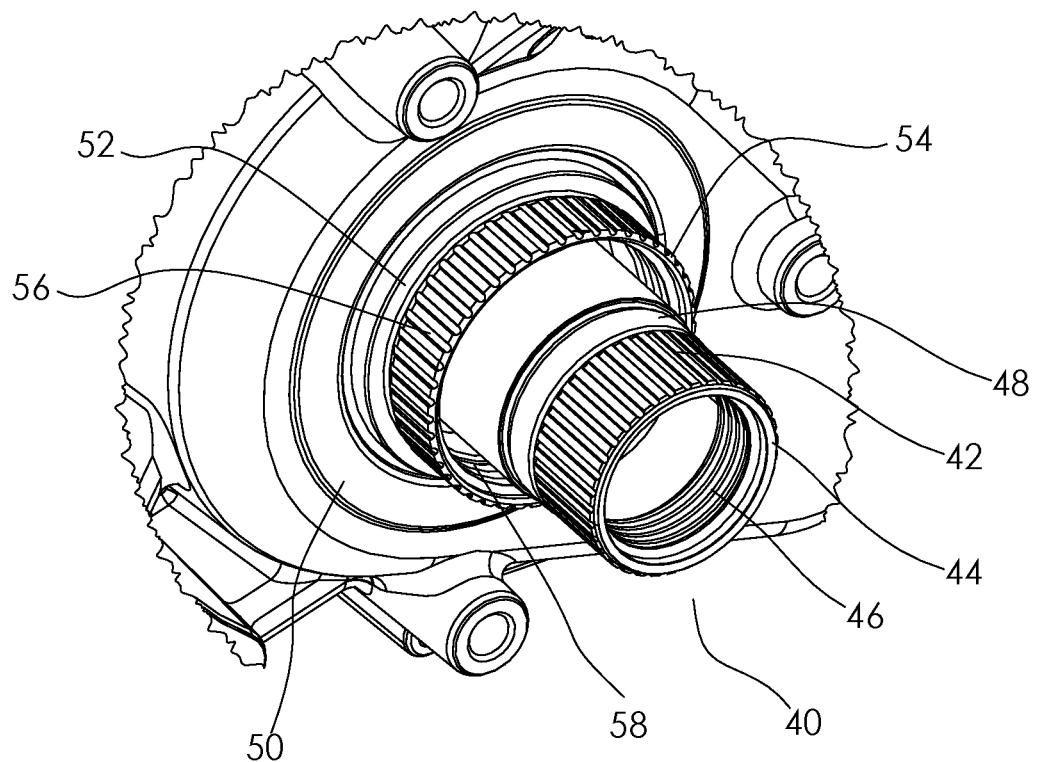
FIG. 5 illustrates a close up view of a motor crank spindle and a motor chainring spindle, in accordance with some embodiments.

FIG. 5 shows a close up view of said motor crank spindle 40 and motor chainring spindle 50, with additional details of each, including crank spindle end face 44, crank spindle inside thread 46, cranks spindle spline 42 and crank spindle stop face 48. Also shown within FIG. 5 are chainring spindle stop face 52, chainring spindle end face 54, chainring spindle spline 56 and chainring spindle internal thread 58.

Figure 6:
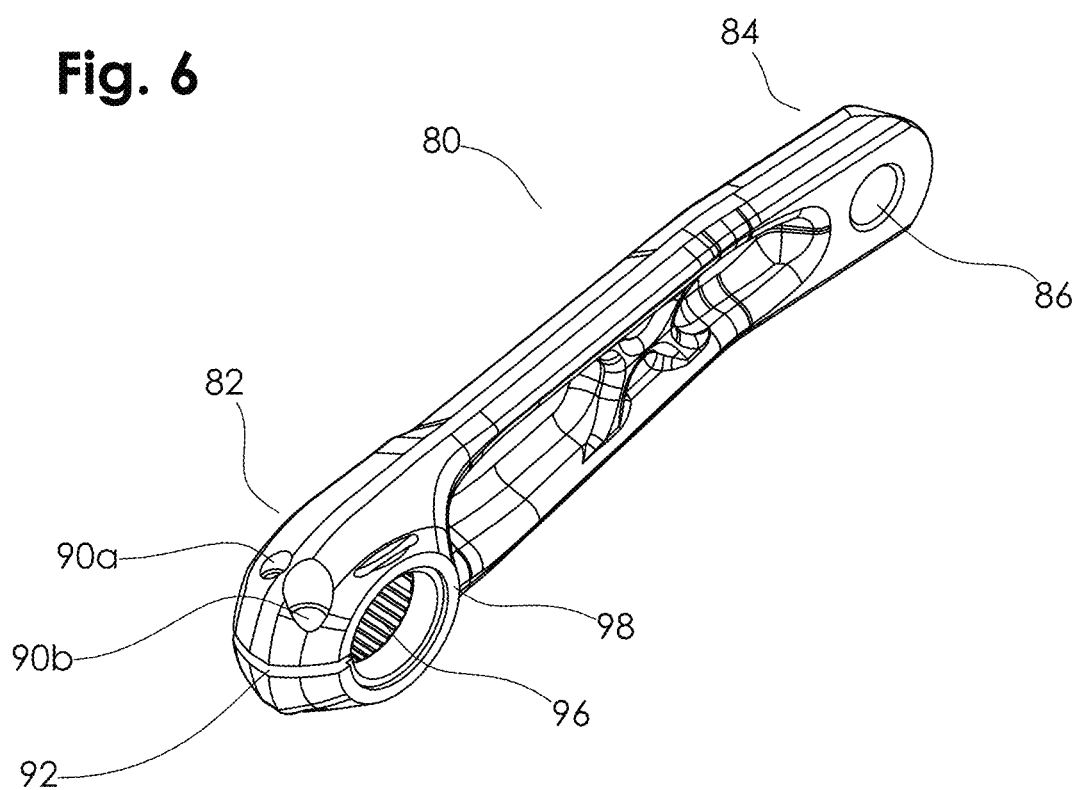
FIG. 6 illustrates a left side view of a drive side crank arm free of the drive assembly, in accordance with some embodiments.

FIG. 6 shows left side view of said drive side crank arm 80 free of the drive assembly. Indicated in this view are the crank arm pedal end 84 which comprises the pedal hole 86. Opposite this end is the crank spindle end 82, which comprises the crank arm spline 96, the arm spindle stop surface 98, the clamp slot 92, and clamp screw holes 90*a* and 90*b*.

Figure 7:
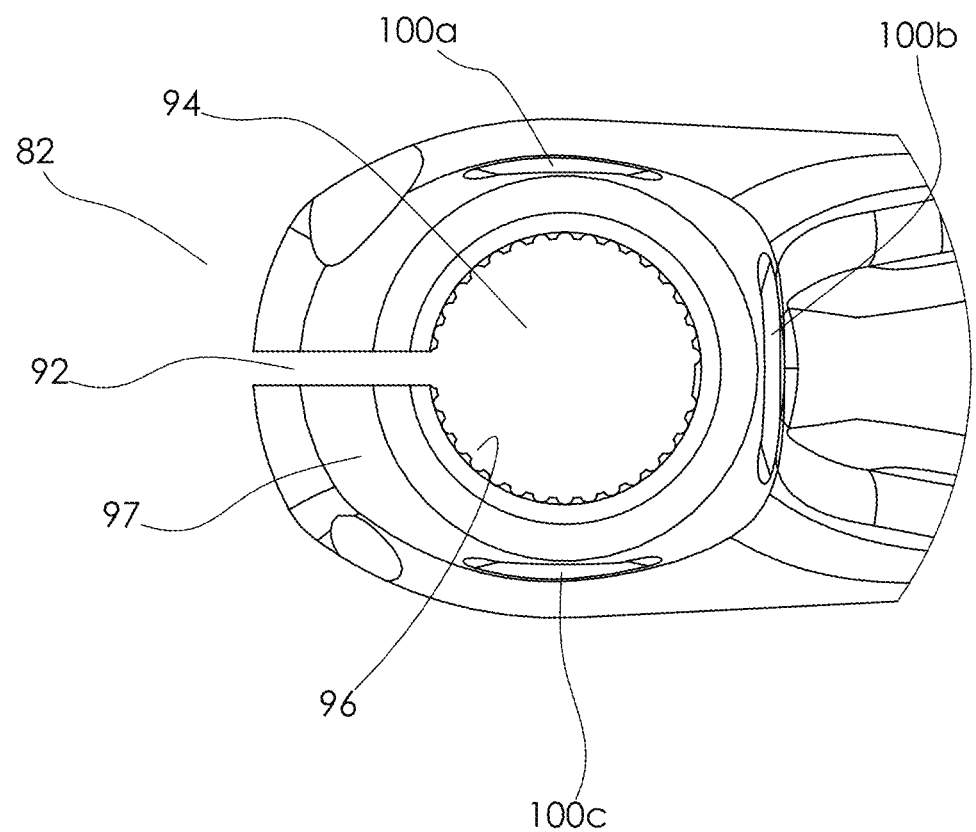
FIG. 7 illustrates a detail view of a crank arm spindle end, in accordance with some embodiments.

FIG. 7 shows a detail view of said crank arm spindle end 82, comprising a crank arm spindle hole 94 and crank-seal mating surface 97. Shown again are clamp slot 92 and crank arm spline 96. Also shown are arm seal groove 100*a-c*.

Figure 8:
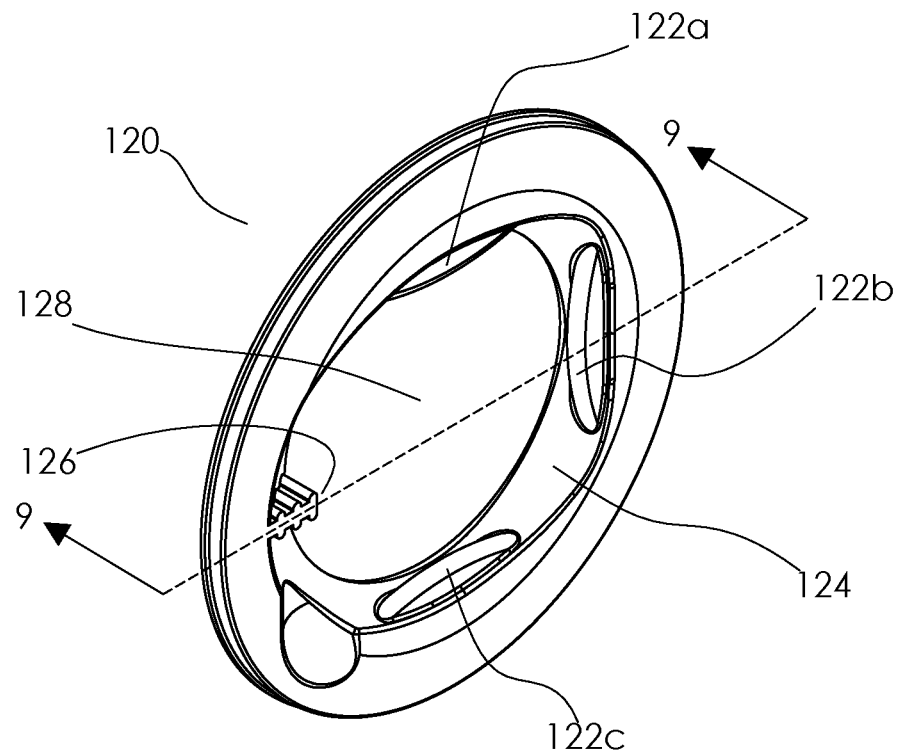
FIG. 8 illustrates a right-rear 3rd angle view of a seal ring, in accordance with some embodiments.

FIG. 8 shows a right-rear 3rd angle view of said seal ring 120. Said seal ring comprises a seal through-hole 128, a seal-crank mating surface 124, a seal crank slot tab 126, and an array of three seal crank retention lip 122*a-c*.

Figure 9:
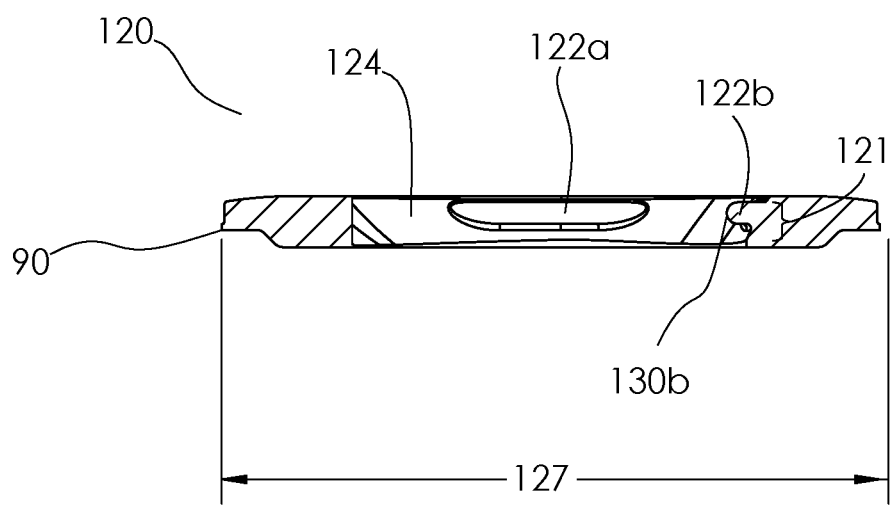
FIG. 9 illustrates a cross section view of a seal ring at section line 9-9 shown in FIG. 8, in accordance with some embodiments.

FIG. 9 shows a cross section view of said seal ring 120. Shown again is seal-crank mating surface 124 having a middle 121, seal crank retention lip 122*a* and seal crank retention lip 122*b*. Said seal ring comprises a seal lip 90 and a seal crank retention lip radius 130*b*. The seal external diameter 127 is detailed in the view.

Figure 10:
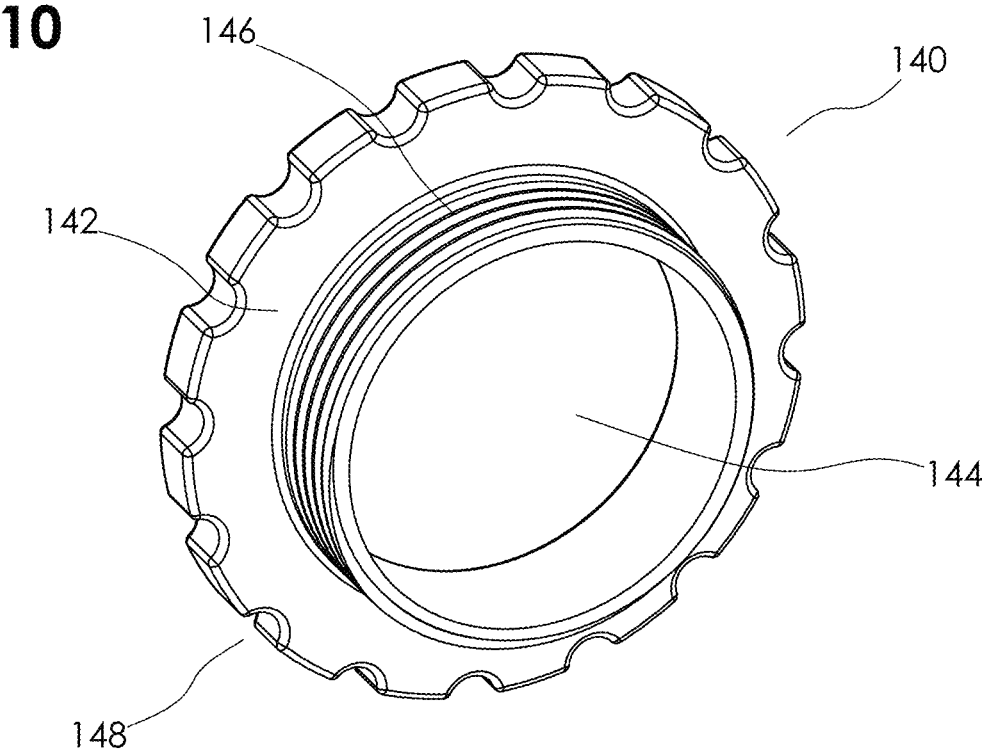
FIG. 10 illustrates an inboard 3rd angle view of a chainring lockring, in accordance with some embodiments.

FIG. 10 is an inboard 3rd angle view of said chainring lockring 140, comprising a lock ring clamp face 142, a lock ring through hole 144, a lock ring external thread 146 and a lock ring tightening spline 148.

Figure 11:
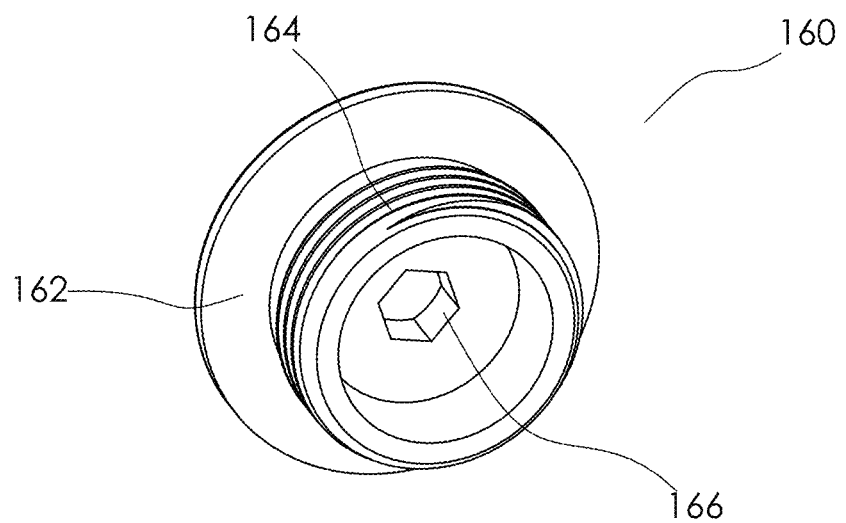
FIG. 11 illustrates an inboard 3rd angle view of an arm retention screw, in accordance with some embodiments.

FIG. 11 is an inboard 3rd angle view of said arm retention screw 160, comprising a retention screw clamp face 162, a retention screw external thread 164 and a retention screw tool interface 166.

Figure 12:
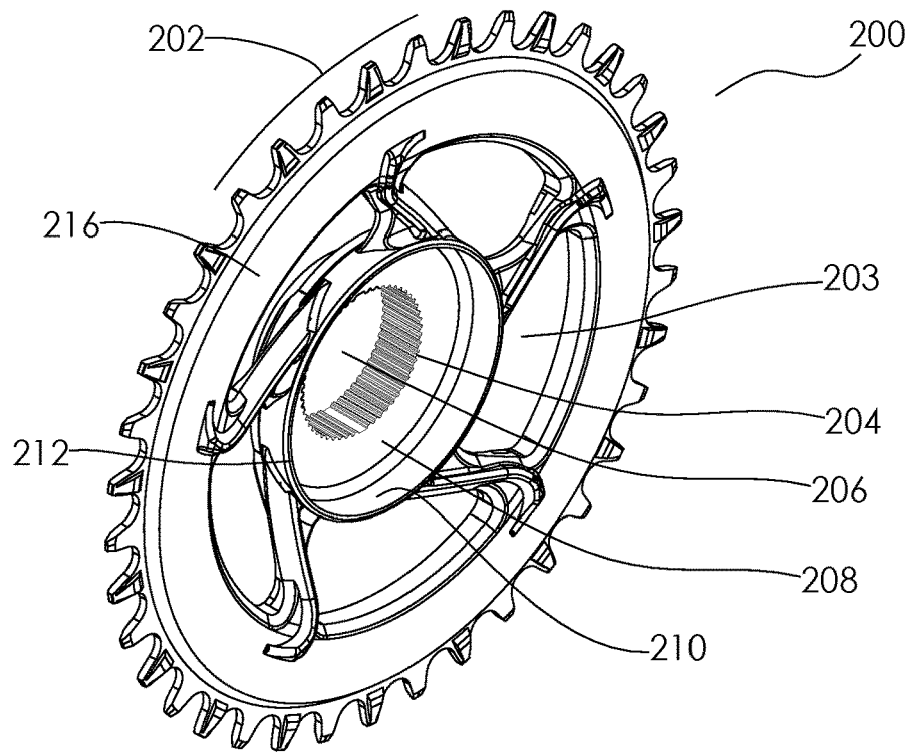
FIG. 12 illustrates an outboard 3rd angle view of a bicycle chainring, in accordance with some embodiments.

FIG. 12 shows an outboard 3rd angle view of said bicycle chainring 200, comprising an array of chainring teeth 202 arranged around the periphery of a chainring annular rim 216. In the center of the chainring is the chainring hub 203, comprising a chainring internal spline 204, a chainring through hole 206, a chainring clamping surface 208 and a chainring lockring well 210, and a lockring well edge 212.

Figure 13:
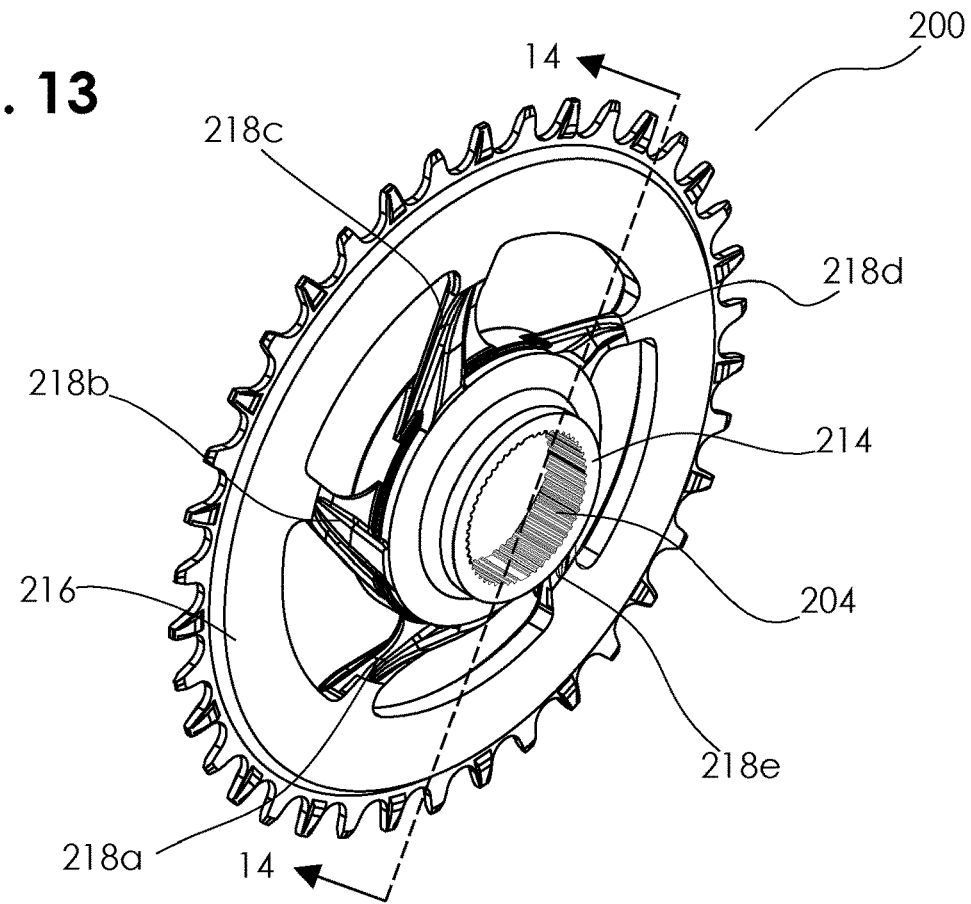
FIG. 13 illustrates an inboard 3rd angle view of a bicycle chainring, in accordance with some embodiments.

FIG. 13 shows an inboard 3rd angle view of said bicycle chainring 200, showing once again the chainring annular rim 216, which is connected to the chainring hub 203 by an arrangement of chainring arms 218a-e. Also shown is chainring stop surface 214 and shown again is chainring internal spline 204.

Figure 14:
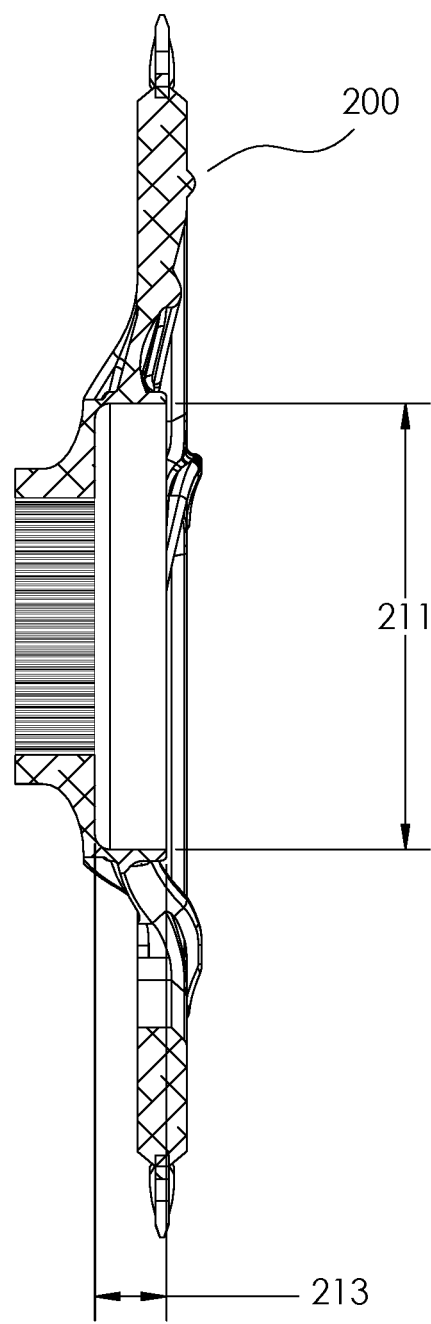
FIG. 14 illustrates a rear cross section view of bicycle chainring at section line 14-14 shown in FIG. 13, in accordance with some embodiments.

FIG. 14 is a rear cross section view of bicycle chainring 200. This view indicates the lockring well diameter 211 and the lockring well depth 213.

Figure 15:
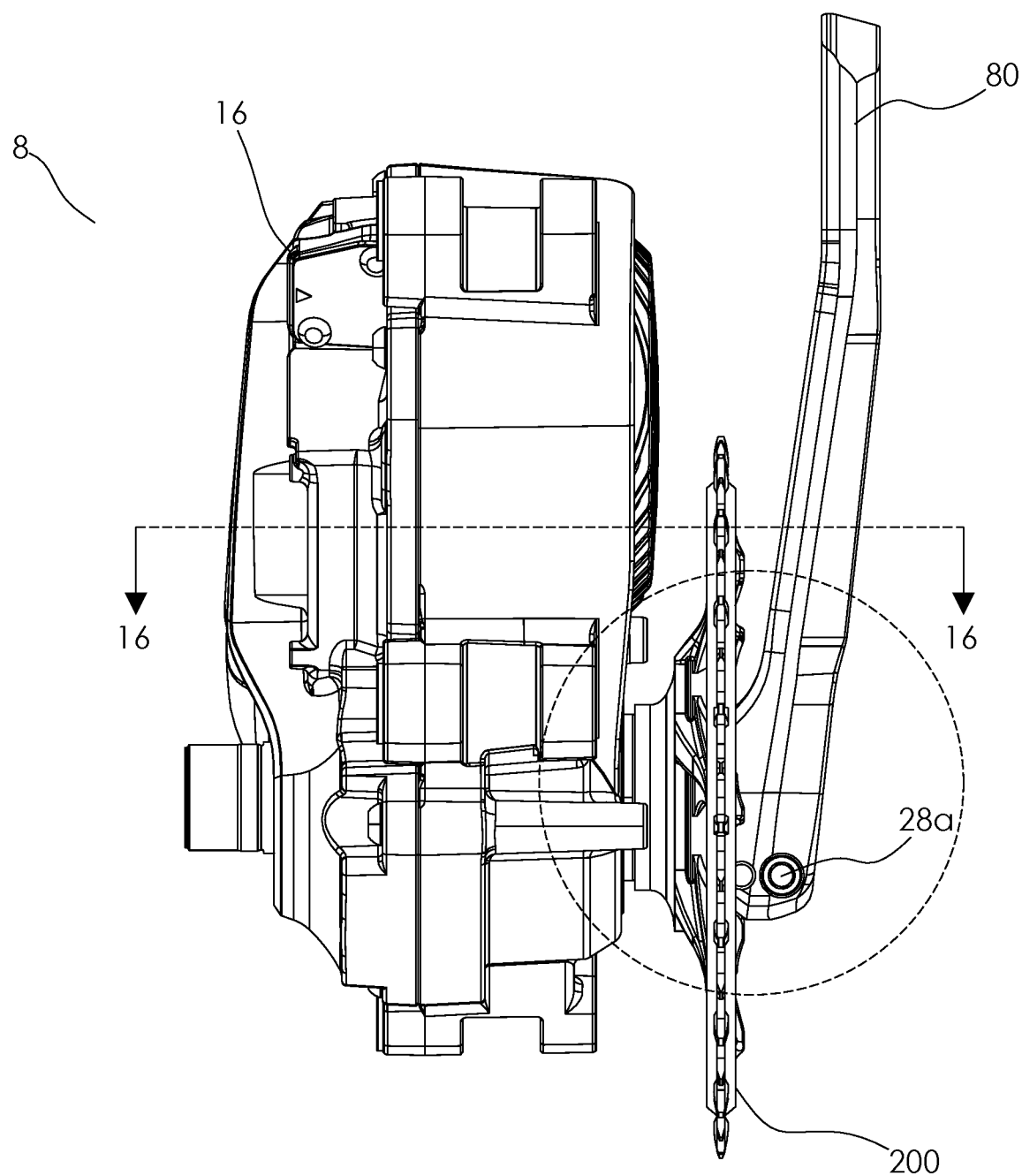
FIG. 15 illustrates a top view of a bicycle drive assembly, in accordance with some embodiments.

FIG. 15 shows a top view of said bicycle drive assembly 8, including bicycle motor 16 with drive side crank arm 80 and bicycle chainring 200 installed in the operative position. Clamp screws 28a can be seen installed in said crank arm.

Figure 16:
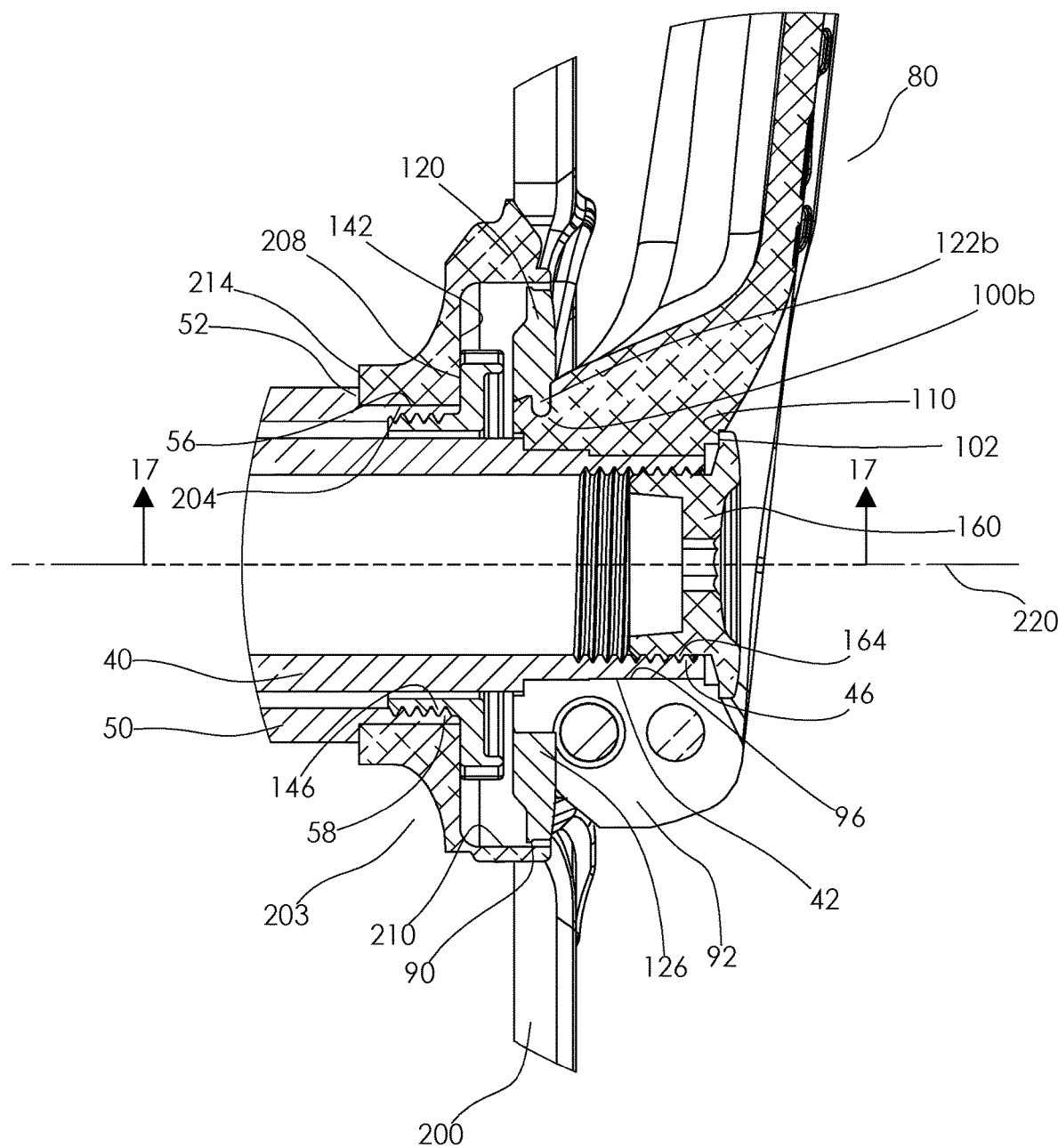
FIG. 16 illustrates a detail section view of a drive assembly at section line 16-16 shown in FIG. 15, in accordance with some embodiments.

FIG. 16 shows a detail section view of said drive assembly, focused on the co-locations and connections between seal ring 120, drive side crank arm 80, bicycle chainring 200 and the associated motor shafts, splines and fasteners. Shown in FIG. 16 is the bicycle chainring 200 installed onto motor chainring spindle 50 where chainring internal spline 204 slides over and engages with chainring spindle spline 56, chainring lockring 140 is installed in said chainring spindle by threading lock ring external thread 146 into chainring spindle internal thread 58 and tightening until chainring clamping surface 208 contacts lock ring clamp face 142, pressing chainring stop surface 214 against chainring spindle stop face 52.

As shown within FIG. 16 is the drive side crank arm 80 which is installed on said motor crank spindle 40 such that crank spindle spline 42 engages and couples with crank arm spline 96. Arm retention screw 160 is shown with retention screw external thread 164 threaded into crank spindle inside thread 46 and fully tightened such that retention screw clamp face 162 presses against a crank arm screw seat 110, pressing the arm spindle stop surface 98 against said crank spindle stop face 48, fixing the axial position of drive side crank arm 80.

As further shown within FIG. 16, the seal ring 120 is shown installed on drive side crank arm 80, with seal crank retention lip 122b tightly fitted into arm seal grooves 100b, and seal crank slot tab 126 slotted into clamp slot 92. The seal ring 120 is shown in its operative position relative to chainring lockring well 210, such that seal lip 90 is centered in chainring lockring well 210. A crank spindle axis 220 is shown, and it can be seen that motor crank spindle 40 and motor chainring spindle 50 are concentric about this axis.

Figure 17:
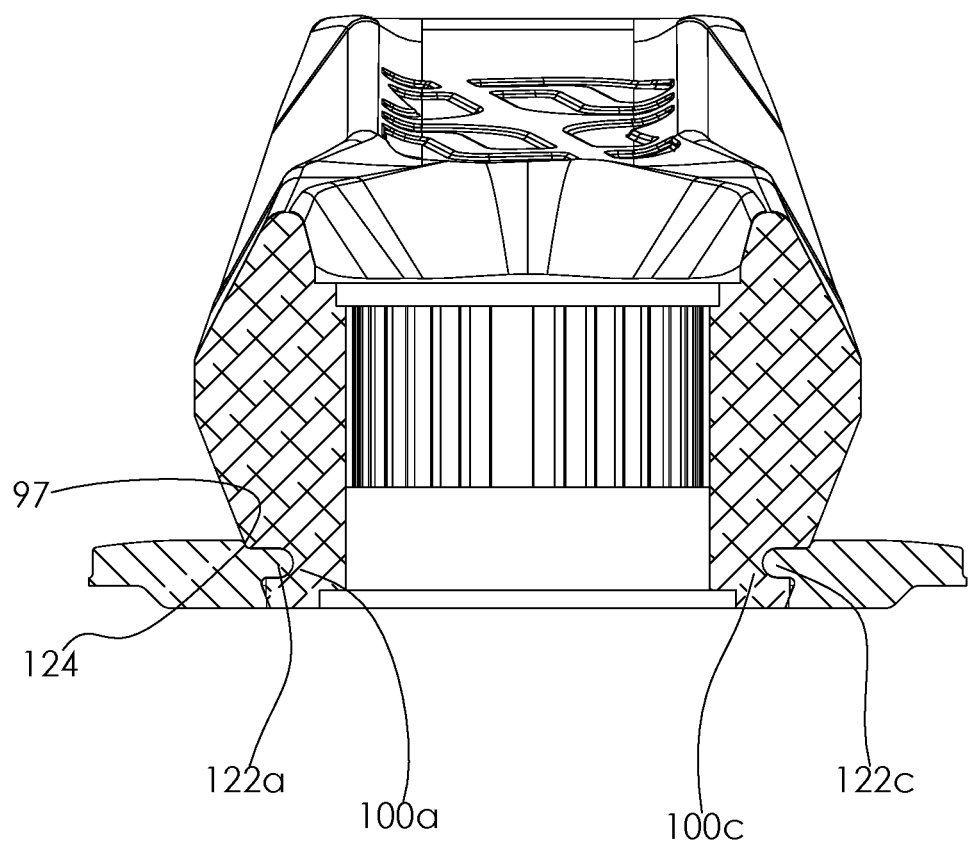
FIG. 17 illustrates a rear cross section view showing a seal ring assembled to a drive side crank arm at section line 17-17 shown in FIG. 16, in accordance with some embodiments.

FIG. 17 shows a rear cross section view showing drive side crank arm 80 assembled to seal ring 120. Shown in the section are crank-seal mating surface 97 abutted against seal-crank mating surface 124. Also shown in this cross section are seal crank retention lip 122a and seal crank retention lip 122c installed in their respective mating features arm seal groove 100a and arm seal groove 100c.

As described above, within the presently claimed invention, a seal ring 120 is tightly fitted to a drive side crank arm 80, such that a crank-seal mating surface 97 comes into complete annular contact with a seal-crank mating surface 124.

In some embodiments, these surfaces are irregularly shaped, that is to say they are not regularly cylindrical, spherical, but are compound curved surfaces which mate with each other perfectly, to provide a surface to surface contact which provides the seal.

In some embodiments, a drive side crank arm 80 uses a pinch-bolt fastening mechanism to fasten the crank arm to the motor crank spindle 40, and in this embodiment a seal crank slot tab 126 is molded into the seal ring 120, to fill and seal the space created by the clamp slot 92, to provide a complete seal at the crank.

Additionally the seal crank slot tab 126 prevents rotation of the seal ring 120 relative to the drive side crank arm 80 about the crank spindle axis 220. This becomes important if the seal ring 120 is designed to develop contact or interference between the seal lip 90 and the chainring lockring well 210, in which case a rotational friction force would develop in the seal lip 90.

In some embodiments, the seal ring 120 may have one or more seal crank retention lip 122a molded into the seal-crank mating surface 124. This retention lip has a matching feature formed in the drive side crank arm 80, as shown by an arm seal groove 100a, where the lip fits tightly into the groove to retain the seal ring 120 to the drive side crank arm 80, and press the crank-seal mating surface 97 against the seal-crank mating surface 124. The bicycle chainring 200 is assembled to the motor chainring spindle 50 and retained in place by the chainring lockring 140, such as shown in FIG. 3.

After chainring installation, the drive side crank arm 80 with the seal ring installed may be fitted to the motor crank spindle 40 and fixed in place by the arm retention screw 160, after which the arm clamp screws 28a and 28b are tightened to clamp the arm to the spindle.

Referring now to FIG. 18, a method of protecting a bicycle drive assembly from contamination is illustrated therein. The method begins in the step 1802. In the step 1804 a bicycle chainring is installed onto a motor chainring spindle of a motor of the bicycle. Then, in the step 1806, a seal ring is fit to a crank seal mating surface of a crank arm and in the step 1808, the crank arm is installed onto a motor crank spindle of the motor of the bicycle.

In some embodiments, the motor chainring spindle and the motor crank spindle are concentric about a crank spindle axis of the bicycle drive assembly. In some embodiments, one or more crank seal retention lips of the seal ring mate with one or more arm seal grooves of the drive side crank arm to fit the seal ring to the drive side crank arm. In further embodiments, a crank slot tab of the seal ring fills a clamp slot space of the drive side crank to provide a complete seal at the bicycle chainring. In some embodiments, the crank slot tab prevents rotation of the seal ring relative to the drive side crank arm about the crank spindle axis. In some embodiments, wherein the crank arm is fitted to the motor crank spindle by one or more arm clamp screws and an arm retention screw. In further embodiments, wherein the crank arm comprises a drive side crank arm. The method ends in the step 1810.

In some embodiments, the crank arm is able to attach to the motor crank spindle using one or more combination of screws, tapered splines, tapered square profiles, where no seal tab is necessary, and the crank-seal mating surface is adequate to make a seal between the crank arm and the seal ring.

Figure 19A:
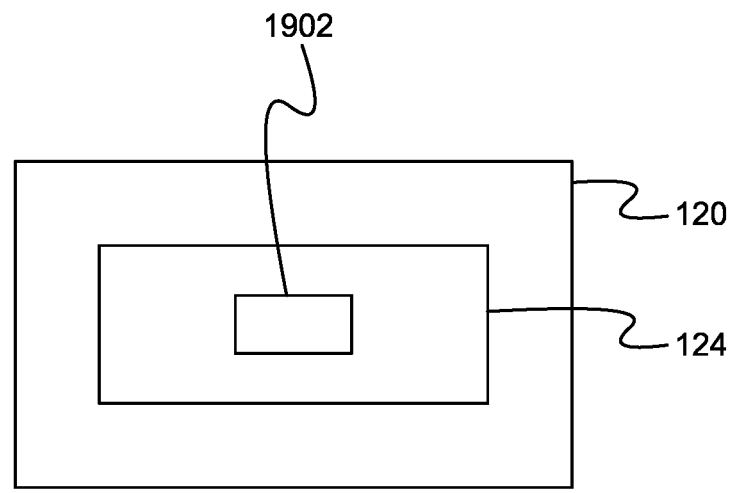
FIG. 19A illustrates a block diagram of a seal ring having a spline shape formed into the seal-crank mating surface in accordance with some embodiments.
Figure 19B:
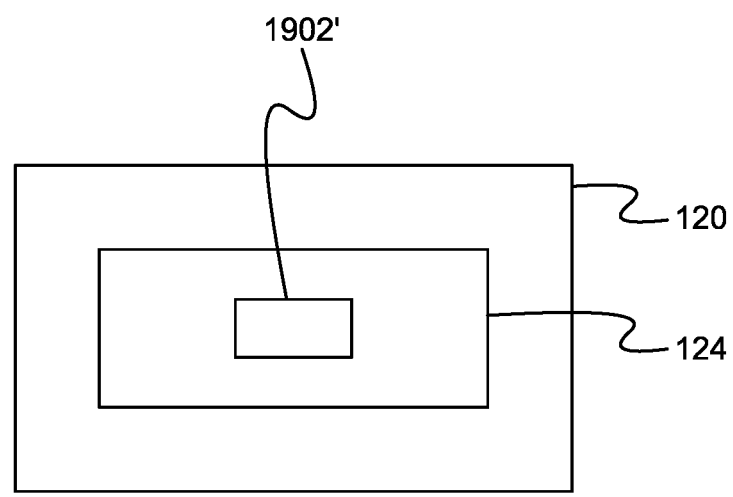
FIG. 19B illustrates a block diagram of a seal ring having a toothed shape formed into the seal-crank mating surface in accordance with some embodiments.

In further embodiments, as illustrated in FIGS. 19A and 19B, the seal ring 120 is able to be retained to the drive side crank arm by a toothed shape 1902' or splined shape 1902 formed into the seal-crank mating surface 124, to prevent rotation between the crank arm and the seal ring 120.

In some embodiments, the seal ring is retained on the crank arm by a separate snap ring, screw, nut, or other commonly available fastener to prevent the seal ring from dislodging once it has been pressed onto the drive side bicycle crank arm.

Particularly, embodiments of the seal lip geometry may be envisioned, based on the many styles of seals presently in common use between rotating shafts commonly found in industry. For instance, a plurality of lips might be arranged on the seal where these lips all contact the chainring well in an annular fashion, to multiply the sealing factor of the assembly and prevent ingress of any material into the assembly. In another embodiment, the seal ring is installed onto the motor crank spindle, and is sandwiched in place between the crank arm and the crank spindle stop face, such that a seal is developed between the arm spindle stop surface and the seal ring. In this case the crank spindle stop face acts as the crank-seal mating surface.

In use, the seal for the bicycle crank with differential chainring motion shields and protects part of a bicycle drivetrain from contamination by materials commonly found in the cycling environment, namely dirt, oil, water and other debris found on cycling surfaces. In the absence of the seal, grit may foul the lockring interfaces, leading to seized threads, and cause difficulty removing the lock ring when it comes time to service the motor or replace the chainring. Particularly, the seal for the bicycle crank with differential chainring motion is able to provide a unique structure to exclude contamination from between two moving members of a bicycle and in some instances where a driving chainring rotates concentrically but independently from a bicycle cranks and a crank mounting spindle. In addition, the seal for the bicycle crank with differential chainring motion is able to prevent those instances where contamination may reach the inner workings of the bicycle motor or gearbox via the space between the motor crank spindle and the motor chainring spindle, or with extreme exposure the area between the two spindles may ingest enough material to damage the spindles or impart significant friction to the motor.

One particular advantage of this is that the seal is easily installed and removed from the crank arm. Because it is easily replaced, the seal could be packaged with the chainring, such that when a worn chainring is replaced with a new chainring, the complementary seal could come with it.

Another advantage of the seal is that the lip design of the seal may be designed using engineering sealing principles to provide greater or lesser levels of sealing depending on the requirements of the bicycle design. For instance in the case of an electrically assisted bicycle where seal drag is not a concern, a more substantial seal with multiple seal lips and more contact pressure might be used to provide exceptional sealing. In the case of a non-electrically assisted gearbox arrangement, a non-contact shield could be constructed to prevent line of site contamination, but reduce rotating seal drag to zero. As such, the seal for a bicycle crank with differential chainring motion such as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A bicycle drive assembly comprising:
   a. a bicycle motor comprising:
      i. a motor chainring spindle; and
      ii. a motor crank spindle;
   b. a bicycle chainring installed onto the motor chainring spindle;
   c. a drive side crank arm including a crank arm spindle hole installed onto the motor crank spindle; and
   d. a seal ring fitted to a crank-seal mating surface of the drive side crank arm, wherein the crank-seal mating surface faces away from the crank arm spindle hole and toward the bicycle motor.

2. The bicycle drive assembly of claim 1, wherein the motor chainring spindle and the motor crank spindle are concentric about a crank spindle axis of the bicycle drive assembly.

3. The bicycle drive assembly of claim 1, wherein one or more crank seal retention lips of the seal ring mate with one or more arm seal grooves of the drive side crank arm to fit the seal ring to the drive side crank arm.

4. The bicycle drive assembly of claim 1, wherein the drive side crank arm is fitted to the motor crank spindle by one or more arm clamp screws and an arm retention screw.

5. The bicycle drive assembly comprising:
   a bicycle motor comprising:
      i. a motor chainring spindle; and
      ii. a motor crank spindle;
   a bicycle chainring installed onto the motor chairing spindle;
   a drive side crank arm including a clamp slot space and a crank arm spindle hole having a central axis, wherein the motor crank spindle is positioned at least partially through the crank arm spindle hole along the central axis, and further wherein a gap formed by the clamp slot space prevents the drive side crank arm from fully surrounding the crank arm spindle hole about the central axis; and
   d. a seal ring fitted to a crank-seal mating surface of the drive side crank arm, wherein a crank slot tab of the seal ring extends into the clamp slot space of the drive side crank arm to provide a complete seal at the bicycle chainring.

6. The bicycle drive assembly of claim 5, wherein the crank slot tab prevents rotation of the seal ring relative to the drive side crank arm about the crank spindle axis.

7. A seal ring configured for fitting to a crank arm of a bicycle for preventing environmental intrusion from contaminating a drive assembly of the bicycle, the seal ring comprising:
   a. a seal through-hole having a central axis;
   b. a seal-crank mating face that is non-parallel with the central axis for fitting a crank seal mating surface of the crank arm, wherein the seal-crank mating face faces toward the seal through-hole; and c. one or more seal crank retention lips extending from a middle of the seal-crank mating face toward the central axis for mating with one or more arm seal grooves of the crank arm.

8. The seal ring of claim 7, further comprising a seal crank slot tab.

9. The seal ring of claim 8, wherein the seal crank slot tab of the seal ring fills a clamp slot space of the crank arm to provide a complete seal.

10. The seal ring of claim 8, wherein the seal crank slot tab prevents rotation of the seal ring relative to the drive side crank arm about the crank spindle axis.

11. The seal ring of claim 7, wherein the crank arm comprises a drive side crank arm.

12. The seal ring of claim 7, wherein the bicycle comprises a motor.

13. A method of protecting a bicycle drive assembly from contamination, the method comprising:
- installing a bicycle chainring onto a motor chainring spindle of a motor of the bicycle;
- fitting a seal ring to a crank-seal mating surface of a crank arm spindle hole; and
- installing the crank arm spindle hole of the crank arm onto a motor crank spindle of the motor of the bicycle such that the crank-seal mating surface faces away from the crank arm spindle hole and toward the motor.

14. The method of claim 13, wherein the motor chainring spindle and the motor crank spindle are concentric about a crank spindle axis of the bicycle drive assembly.

15. The method of claim 13, wherein one or more crank seal retention lips of the seal ring mate with one or more arm seal grooves of the drive side crank arm to fit the seal ring to the drive side crank arm.

16. The method of claim 13, wherein the crank arm is fitted to the motor crank spindle by one or more arm clamp screws and an arm retention screw.

17. The method of claim 13, wherein the crank arm comprises a drive side crank arm.

18. The method of protecting a bicycle drive assembly from contamination, the method comprising:
- installing a bicycle chainring onto a motor chainring spindle of a motor of the bicycle;
- fitting a seal ring to a crank-seal mating surface of a crank arm, the crank arm including a clamp slot space and a crank arm spindle hole having a central axis; and
- positioning a motor crank spindle of the motor of the bicycle at least partially through the crank arm spindle hole along the central axis, wherein a gap formed by the clamp slot space prevents the drive side crank arm from fully surrounding the crank arm spindle hole about the central axis and a crank slot tab of the seal ring extends into the clamp slot space of the crank arm to provide a complete seal at the bicycle chainring.

19. The method of claim 18, wherein the crank slot tab prevents rotation of the seal ring relative to the crank arm about the crank spindle axis.

* * * * *